US011577808B1

United States Patent
Schmidt et al.

(10) Patent No.: US 11,577,808 B1
(45) Date of Patent: Feb. 14, 2023

(54) REDUCED POSITIONING CONTROL REQUIREMENTS FOR MAINTAINING REDUCED WAVE-MAKING RESISTANCE OF A VESSEL OPERATING IN A SEAWAY

(71) Applicants: Terrence W. Schmidt, Santa Clara, CA (US); Jeffrey E. Kline, Severna Park, MD (US)

(72) Inventors: Terrence W. Schmidt, Santa Clara, CA (US); Jeffrey E. Kline, Severna Park, MD (US)

( * ) Notice: Subject to any disclaimer, the term of this patent is extended or adjusted under 35 U.S.C. 154(b) by 0 days.

(21) Appl. No.: 17/682,571

(22) Filed: Feb. 28, 2022

(51) Int. Cl.
*B63B 79/40* (2020.01)
*B63B 79/30* (2020.01)
*B63B 79/15* (2020.01)
*G05D 1/02* (2020.01)

(52) U.S. Cl.
CPC ............. *B63B 79/40* (2020.01); *B63B 79/15* (2020.01); *B63B 79/30* (2020.01); *G05D 1/0206* (2013.01)

(58) Field of Classification Search
CPC ......... B63B 79/40; B63B 79/15; B63B 79/30; G05D 1/0206
See application file for complete search history.

(56) References Cited

U.S. PATENT DOCUMENTS

| 8,437,509 | B1 | 5/2013 | Hallenborg et al. |
| 10,921,809 | B2 | 2/2021 | Berg et al. |
| 2010/0320759 | A1 | 12/2010 | Lightfoot et al. |
| 2016/0147223 | A1 | 5/2016 | Edwards et al. |
| 2018/0105236 | A1 | 4/2018 | Bhageria et al. |
| 2020/0333781 | A1* | 10/2020 | Clarke ............... G08G 3/02 |
| 2021/0078682 | A1 | 3/2021 | Schmidt et al. |

* cited by examiner

*Primary Examiner* — Jess Whittington
*Assistant Examiner* — Brian E Yang
(74) *Attorney, Agent, or Firm* — Renner, Otto, Boisselle & Sklar, LLP

(57) ABSTRACT

A system and method that reduces spatial positioning control requirements for maintaining reduced wave-making resistance of at least one following vessel in a fleet operating in a seaway, by determining a position of the at least one following vessel within a coordinated zone, which is a zone within a reduced wave-making resistance region of the Kelvin wake of at least one lead vessel, at which a surge motion of the vessels is synchronized with each other. By positioning the at least one following vessel in the coordinated zone, the spatial positioning control requirements of the at least one following vessel can be reduced.

29 Claims, 21 Drawing Sheets

REDUCED POSITIONING CONTROL REQUIREMENTS FOR MAINTAINING REDUCED WAVE-MAKING RESISTANCE OF A VESSEL OPERATING IN A SEAWAY

TECHNICAL FIELD

The present application relates generally to spatial control of vessels, and more particularly to reducing spatial control requirements for maintaining reduced wave-making resistance of vessels operating in a seaway.

BACKGROUND

Vessels operating in a seaway may be subjected to a wide array of operating costs. A major operating cost may include fuel consumption of the vessel, which may be affected by multiple factors.

SUMMARY

One exemplary factor that may affect fuel consumption of vessels operating in the seaway may include wave-making resistance of the vessels. Wave-making resistance may be caused by the production of a wake pattern as the vessels move across the surface of the seaway. In 1887, Lord Kelvin demonstrated that a wake pattern created by an object (e.g., vessels) moving at a uniform speed over a surface of water (e.g., the seaway) may always be delimited by an angle equal to arcsin $1/3$=19.5 degrees. As such, the wake pattern produced by the vessels as they move across the surface of the seaway is known as a Kelvin wake.

In producing the Kelvin wake, vessels displace water as they travel over the surface of the seaway which requires energy. This energy is typically reflected as the wave-making resistance of the vessels (i.e., the amount of energy needed to displace the water out of the way of the hull of the vessels to move across the surface of the seaway). As such, the wave-making resistance of the vessels may affect the fuel consumption required for operating the vessels in the seaway (i.e., a higher wave-making resistance of the vessels may be associated with a higher fuel consumption cost of the vessels). U.S. patent application Ser. No. 16/988,668 filed Mar. 18, 2021 by the present inventors disclosed one or more aspects of a system and method that reduces wave-making resistance of vessels, thereby resolving at least some of these problems associated with vessels. As such, the present application is related to U.S. application Ser. No. 16/988,668, the entire disclosure of which is hereby incorporate herein by reference in its entirety.

Another exemplary factor that may affect fuel consumption of vessels operating in the seaway may include seaway-induced vessel motions caused by seaway waves. For example, interactions between the vessels and the seaway waves may cause seaway-induced vessel motions that alter desired tracks of the vessels. To return to the desired tracks, the vessels may consume fuel. As such, seaway-induced vessel motions caused by the sea waves may affect the fuel consumption required for operating the vessels in the seaway (i.e., a greater return distance to desired tracks and/or a higher amount of return to desired tracks instances may be associated with a higher fuel consumption cost of the vessels).

Attempts at reducing operating costs of vessels have proven difficult. As such, there is a need for improved reduction of operating costs of vessels operating in the seaway.

An aspect of the present disclosure provides a system and method that reduces spatial positioning control requirements for maintaining reduced wave-making resistance of at least one vessel that follows at least one other vessel operating in a seaway where the vessels are exposed to surge motion by the seaway waves.

More particularly, an aspect of the present disclosure provides a system and method that reduces spatial positioning control requirements for maintaining reduced wave-making resistance of at least one following vessel following in the Kelvin wake of at least one lead vessel in a fleet operating in a seaway, by determining a spatial position of the following vessel within a coordinated surge motion and wave-making resistance reduction zone, which is a zone within a reduced wave-making resistance region of the Kelvin wake of the at least one lead vessel, at which a surge motion of the vessels is synchronized with each other. By positioning the at least one following vessel in the surge motion and wave-making resistance reduction zone, the spatial positioning control requirements of the at least one following vessel can be reduced.

In accordance with another aspect of the present disclosure, the techniques may be used to aggregate two or more independently controlled vessels into a controlled formation (e.g., a fleet formation) such that at least one following vessel may operate with reduced spatial positioning control requirements for maintaining reduced wave-making resistance. The two or more vessels may be disaggregated at any suitable time.

The synchronization of the vessels is such that the seaway-induced surge motion of the vessels causes the vessels to surge together at about the same time with about the same direction and magnitude. The synchronization of the vessels may be such that they are positioned in phase with a determined wavelength and direction of the sea waves that cause the surge motion. For example, the in-phase positioning of the vessels may be such that their bows are positioned at respective troughs of the surge-motion-inducing sea waves travelling across the bows. Alternatively, the bow of each vessel could be positioned at respective crests of the surge-motion-inducing sea waves. The determined wavelength and direction of the surge-motion-inducing sea waves may be a predominant wavelength and direction of the sea waves sensed by a local sensor onboard the vessel or onboard another vessel nearby the vessel, such as within the vessel's fleet. The surge motion may be a maximum surge motion of the vessel as detected by the sensor(s).

The determination of the reduced wave-making resistance region at which to position the at least one following vessel may be used to at least partially destructively cancel at least one wave pattern of a Kelvin wake of at least one following vessel. This can be done by positioning the at least one following vessel within the reduced wave-making resistance region behind at least one lead vessel (e.g., by spatially separating the at least one following vessel from the at least one lead vessel at a distance where waves (i.e., transverse waves and/or divergent waves) of the Kelvin wake produced by the at least one lead vessel and the at least one following vessel are out of phase with one another and at least partially destructively cancel each other when operating in the spatially controlled formation). Such destructive cancelation may be achieved by placing the bow of the at least one following vessel within a trough of the wave pattern of the Kelvin wake of the lead vessel, as described in U.S. patent application Ser. No. 16/988,668 by the present inventors.

Although the above-described manner of positioning the following vessel within a reduced wave-making resistance region can be effective to reduce fuel consumption, the practicality of seafaring vessels is that they can be exposed to surge-motion-inducing waves which can, in some instances, make it less fuel efficient for the following vessel to maintain its position behind the lead vessel within the determined reduced wave-making resistance region. This is because, without taking sea wave-induced motion into account, the following vessel can surge in a different direction and/or by a different amount relative to the lead vessel, therefore requiring additional fuel to keep the following vessel on track within the reduced wave-making resistance region. By synchronizing the surge motions of the lead and following vessels, however, the spatial positioning control requirements associated with maintaining the at least one following vessel within the reduced wave-making resistance region is reduced.

One exemplary benefit of this spatially controlled formation is that minimal control actuation power may be required to maintain the at least one following vessel within the reduced wave-making resistance region. This is accomplished by determining and positioning the at least one following vessel within the coordinated surge motion and wave-making resistance reduction zone. Accordingly, a reduction in fuel consumption of the at least one following vessel may be realized.

In accordance with another aspect of the present disclosure, the at least one lead vessel and the at least one following vessel may form a fleet formation including at least one lead vessel and at least one following vessel.

In the fleet formation, the terms lead vessel and following vessel may be relative to the vessels of the fleet formation. For example, if there are three vessels in the fleet formation spaced longitudinally from one another (e.g., a forward-most vessel, an intermediate vessel, and a rearward-most vessel), the forward-most vessel may be a lead vessel relative to the intermediate vessel and/or the rearward-most vessel, the intermediate vessel may be a following vessel relative to the forward-most vessel and a lead vessel relative to the rearward-most vessel, and the rearward-most vessel may be a following vessel relative to the forward-most vessel and the intermediate vessel. The vessels of the fleet formation may change position within the fleet formation as necessary.

The at least one lead vessel and/or the at least one following vessel in the fleet formation may include at least one spatial positioning control system for controlling the operation of the at least one lead vessel and/or the at least one following vessel in the seaway. The spatial positioning control system may include sensors, databases, etc., to collect, store, and use data. For example, a wave sensing tool and/or sensor, or combination of tools and/or sensors, may be used to sense a wavelength and direction of seaway waves that produce a particular surge motion of the at least one lead vessel and/or the at least one following vessel. The spatial positioning control system may use a control algorithm to adjust parameters (e.g., speed, longitudinal, and/or lateral positions) associated with the at least one lead vessel and/or the at least one following vessel such as, for example, spatial position, actuation, and coordinate reference positions (e.g., latitude, longitude, GPS, etc.).

Exemplary data that may be obtained by the spatial positioning control system may include vessel position data, vessel speed data, seaway-induced vessel motion data, seaway wave forecast information, etc.), vessel data (e.g., propulsion status, rudder position, inertial data, relative spatial position, reduced wave-making resistance regions, coordinated wave-making resistance reduction zones for all operational speeds, etc.), and/or any other suitable data. This data may be used to, inter alia, maintain and/or update a spatial position model of the coordinated vessel fleet formation.

When operating in the fleet formation, one or more of the at least one spatial positioning control systems of the at least one lead vessel and the at least one following vessel may include at least one controller configured to control spatial formation of the at least one lead vessel and/or the at least one following vessel. In some implementations, the at least one controller provided on one vessel may be a superordinate control and the at least one controller provided on each of the remaining vessels of the fleet formation may be a subordinate controller. The superordinate controller may include a vessel coordination layer that uses data obtained from each of the vessels of the fleet formation to determine relative spatial positions of the vessels to minimize spatial positioning control requirements for maintaining wave-making resistance of the vessels.

The superordinate controller may transmit, via at least one communications link, spatial position data to subordinate controllers of the at least one following vessel. The subordinate controller of each of the at least one following vessel may use the spatial position data to maintain each of the at least one following vessel at a spatial position that reduces the spatial positioning control requirements for maintaining reduced wave-making resistance. For example, if the at least one following vessel moves out of the reduced wave-making resistance reduction zone, the subordinate controllers may generate command signals that automatically move, if needed, the at least one following vessel into the reduced wave-making resistance reduction zone, and/or may generate signals allowing an operator of the at least one following vessel to move the at least one following vessel into the wave-making resistance reduction zone.

In accordance with another aspect of the present disclosure, the techniques may provide a means of operating at least one lead vessel and at least one following vessel, which may be manned or unmanned, such that the at least one following vessel may operate with reduced the spatial positioning control requirements for maintaining reduced wave-making resistance across the at least one following vessel's entire speed regime throughout seaway state conditions.

As stated above, this may be accomplished, at least in part, by using a spatial positioning control system, which may include at least one controller that may determine relative locations of multiple vessels, define a Kelvin wake of each of the multiple vessels, determine a reduced wave-making resistance region for each following vessel of the multiple vessels, determine a wavelength and direction of sea waves that produces surge motion of at least one vessel of the multiple vessels, determine a spatial position of the at least one following vessel that, when occupied by the at least one following vessel, positions the at least one following vessel within a wave-making resistance reduction zone in phase with the determined wavelength of the sea waves such that the surge motion of the at least one following vessel is in phase with the determined wavelength of the sea waves; and output information associated with the determined spatial position of the at least one following vessel for enabling positioning the at least one following vessel at the determined spatial position thereby reducing the spatial positioning control requirements for maintaining the reduced wave-making resistance of the at least one following vessel.

The techniques of the present disclosure may further be used to provide the information necessary for an operator of a manned vessel to control the spatial positions of a vessel in a defined formation in a seaway and/or to control the aggregation of a vessel into, and/or the disaggregation of a vessel out of, a defined multiple vessel formation in a seaway. The techniques of the present disclosure may further be used to provide signals necessary to controls a vessel's spatial position maneuvering, such as, for example, a propulsion system and/or a steering system for unmanned and/or manned vessels.

According to at least one aspect of the present disclosure, a system for reducing spatial positioning control requirements for maintaining reduced wave-making resistance of at least one following vessel in a fleet of vessels operating in a seaway may be provided. The system may comprise: at least one controller configured to: obtain data including: position and speed data of at least one lead vessel in the fleet; and seaway-induced vessel motion data of one or more vessels in the fleet; determine at least one wave pattern of a Kelvin wake of the at least one lead vessel based, at least in part, on the position and speed data of the at least one lead vessel; determine at least one reduced wave-making resistance region within the Kelvin wake of the at least one lead vessel that, when occupied by the at least one following vessel, at least partially destructively cancels at least one wave pattern of a Kelvin wake of the at least one following vessel; determine a wavelength and a direction of seaway waves that cause a surge motion of the one or more vessels in the fleet based, at least in part, on the seaway-induced vessel motion data; determine a spatial position of the at least one following vessel that, when occupied by the at least one following vessel, positions the at least one following vessel within at least one coordinated zone, which is a zone within the determined at least one reduced wave-making resistance region at which the at least one lead vessel and the at least one following vessel have a synchronized surge motion, wherein the synchronized surge motion is based, at least in part, on the determined wavelength and the direction of the seaway waves that cause the surge motion of the of one or more vessels in the fleet; and output information associated with the determined spatial position of the at least one following vessel for enabling positioning the at least one following vessel at the determined spatial position thereby reducing the positioning control requirements for maintaining the reduced wave-making resistance of the at least one following vessel.

According to another aspect, a method of reducing spatial positioning control requirements for maintaining reduced wave-making resistance of at least one following vessel in a fleet of vessels operating in a seaway may be provided. The method may comprise: determining at least one wave pattern of a Kelvin wake of at least one lead vessel in the fleet; determining at least one reduced wave-making resistance region within the Kelvin wake of the at least one lead vessel that, when occupied by the at least one following vessel, at least partially destructively cancels at least one wave pattern of a Kelvin wake of the at least one following vessel; determining a wavelength and a direction of seaway waves that cause a surge motion of one or more vessels in the fleet; determining a spatial position of the at least one following vessel that, when occupied by the at least one following vessel, positions the at least one following vessel within at least one coordinated zone, which is a zone within the determined at least one reduced wave-making resistance region at which the at least one lead vessel and the at least one following vessel have a synchronized surge motion, wherein the synchronized surge motion is based, at least in part, on the determined wavelength and the direction of the seaway waves that cause the surge motion of the of one or more vessels in the fleet; and positioning the at least one following vessel at the determined spatial position.

According to another aspect, a method of reducing spatial positioning control requirements for maintaining reduced wave-making resistance of at least one following vessel in a fleet of vessels operating in a seaway may be provided. The method may comprise: determining at least one wave pattern of a Kelvin wake of at least one lead vessel in the fleet; determining at least one reduced wave-making resistance region within the Kelvin wake of the at least one lead vessel that, when occupied by the at least one following vessel, at least partially destructively cancels at least one wave pattern of a Kelvin wake of the at least one following vessel; determining a wavelength and a direction of seaway waves that cause a surge motion of one or more vessels in the fleet; determining a spatial position of the at least one following vessel that, when occupied by the at least one following vessel, positions the at least one following vessel within at least one coordinated zone, which is a zone within the determined at least one reduced wave-making resistance region at which the at least one lead vessel and the at least one following vessel have a synchronized surge motion, wherein the synchronized surge motion is based, at least in part, on the determined wavelength and the direction of the seaway waves that cause the surge motion of the of one or more vessels in the fleet; determining an alignment discrepancy associated with an alignment of the at least one coordinated zone; and improving the alignment of the at least one coordinated zone based, at least in part, on the determined alignment discrepancy.

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

The present disclosure has particular application to a fleet of vessels operating in seaway, and will be described below chiefly in this context. A seaway, which may be defined as any navigable body of water having a surface that waves form thereon (e.g., oceans, seas, large lakes, etc.), and which may allow a vessel to perform various actions, such as, for example, transportation of goods from one point to another. Accordingly, a vessel may be defined as any vessel that may navigate the seaway, including any suitable watercraft, such as ships, boats, floating vessels, displacement vessels, or the like. A fleet includes two or more such vessels, one or more of which may be the same as each other or different from each other. A lead vessel in the fleet is one that produces a Kelvin wake, and a following vessel is one that follows the lead vessel within the lead vessel's Kelvin wake. There may be multiple lead vessels and multiple following vessels in a fleet, and there may be other vessels within the fleet that are neither lead nor following vessels.

Many factors may affect operational costs of vessels operating in the seaway, such as, for example, fuel consumption costs. As stated above, two exemplary factors that may fuel consumption costs may include wave-making resistance of vessels and seaway-induced vessel motions caused by seaway waves. As such, reducing spatial positioning control requirements for maintaining reduced wave-making resistance of vessels may be beneficial.

To reduce wave-making resistance, the techniques of the present disclosure may define Kelvin wake wave-making resistance reduction regions. Two exemplary distinct features of a Kelvin wake may include transverse waves and divergent waves. Transverse waves may be defined as waves traveling roughly perpendicular to a vessel's track (i.e., propagating parallel to the vessel's track). The transverse waves may be observed extending across an otherwise relatively calm area between sides of a wake. The transverse waves may always be contained within a Kelvin Wake angle and may always reach an outer boundary of the Kelvin wake angle.

Divergent waves may be defined as waves traveling diagonally outwards relative to the vessel's track. The divergent waves may be observed as a wake of a vessel with a series of diagonal or oblique crests moving at an angle to the vessel's track.

Figure 1:
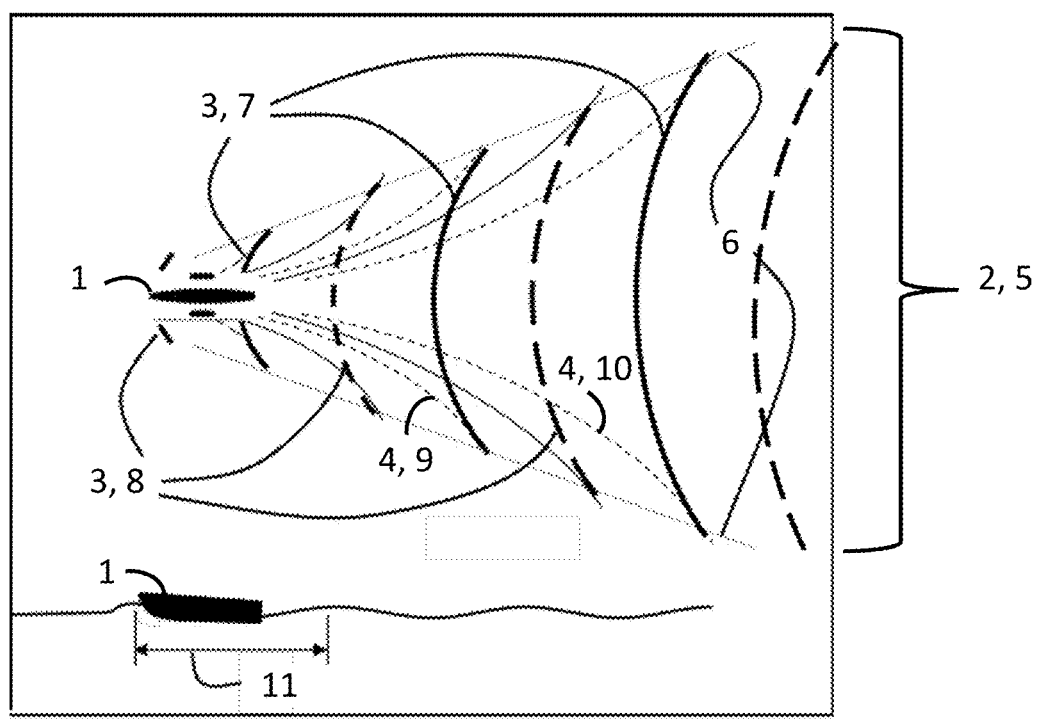
FIG. 1 illustrates a plan and an elevation view of a vessel and its Kelvin wake while traveling at a primary hump speed.

The wake pattern may be strongly dependent upon a Froude number (Fr) where $Fr=v/(g*l)^{0.5}$ and where v is the vessel's speed, g is acceleration due to gravity, and l is a waterline length of the vessel. FIG. 1 illustrates a plan and an elevation view of a vessel 1 and its Kelvin wake 2 while traveling at a primary hump speed. The Kelvin wake 2 may include transverse waves 3 and divergent waves 4. The transverse waves of the Kelvin wake may be observable as large periodic waves within a V-pattern 5 and within a Kelvin angle 6. The transverse waves may include transverse wave troughs 7 (solid lines) and transverse wave crests 8 (dashed lines). FIG. 1 further illustrates a wavelength 11 of the transverse waves 3. The divergent waves 4 may include divergent wave troughs 9 (solid lines) and divergent wave crests 10 (dashed lines).

At low Froude numbers, the wave energy may be dominated by the transverse waves and may be spread almost uniformly from one side of the Kelvin angle 6 to the other side of the Kelvin angle 6. As Froude number and speed increases, the amplitude of the transverse waves 3 decreases, the amplitude of the divergent waves 4 increases, and the energy of the transverse waves and the divergent waves begins to concentrate towards the outer regimes of the Kelvin angle 6.

Figure 2:
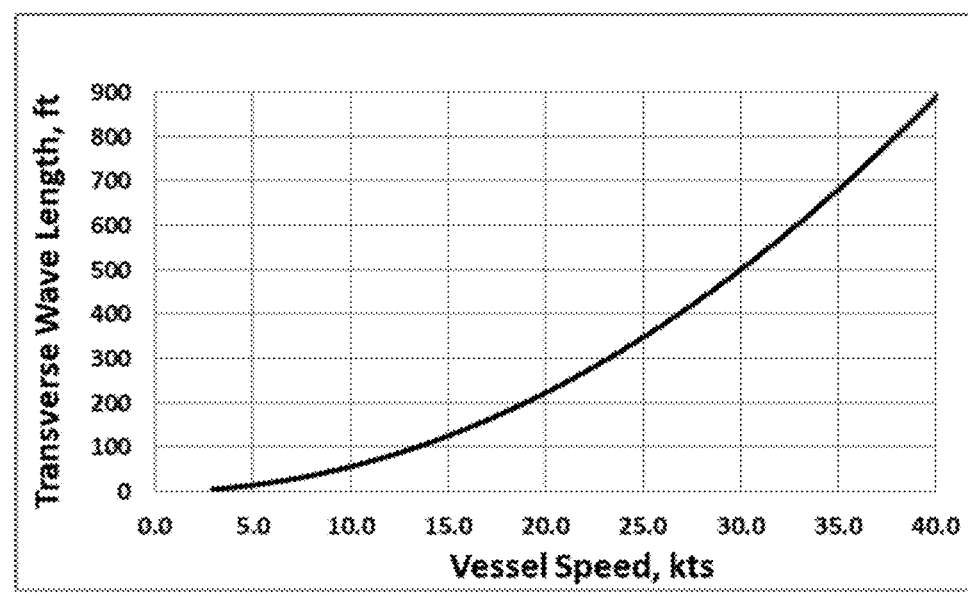
FIG. 2 illustrates a graph of transverse wavelength in feet (ft) versus vessel speed in knots (kts).

A direct relationship may exist between a vessel's waterline length and a speed and a magnitude of the wave-making resistance. FIG. 2 illustrates a graph of transverse wavelength in feet (ft) versus vessel speed in knots (kts). The vessel's transverse wave's wavelength, which may be determined by the vessel's speed, may be expressed by $\lambda=2\pi v^2/g$ (where $\lambda$ is the transverse wavelength, v is the vessel speed and g is the acceleration due to gravity).

Spatial positioning may be used to reduce wave-making resistance of vessels. For example, at least one wave pattern of a Kelvin wake of at least one lead vessel may be determined based, at least in part, on position and speed data of the at least one lead vessel. At least one region within the Kelvin wake of the at least one lead vessel that, when occupied by at least one following vessel, at least partially destructively cancels at least one wave pattern of a Kelvin wake of the at least one following vessel may be determined.

Figure 3:
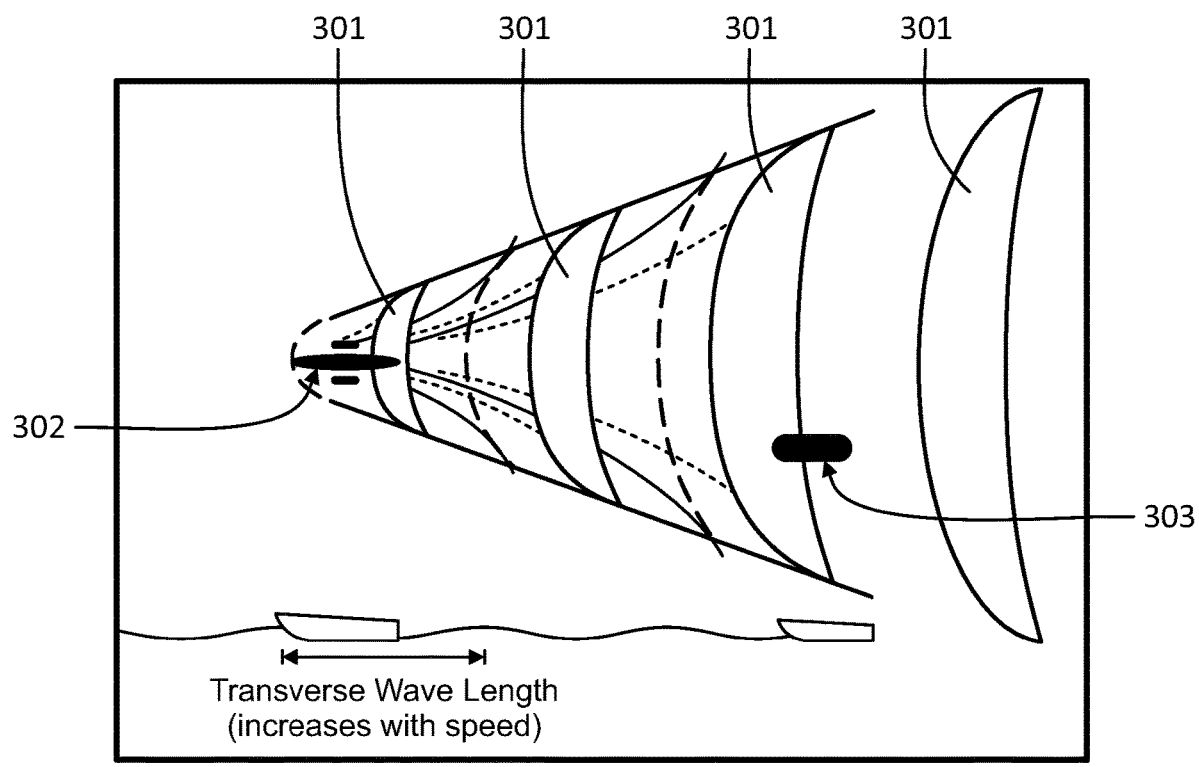
FIG. 3 illustrates regions 301 within the Kelvin wake where the bow of a following vessel is positioned within the region wave-making resistance of the following vessel is substantially reduced.

FIG. 3 illustrates regions 301, which may be referred to as reduced wave-making resistance regions, within the wave pattern of a Kelvin wake of at least one lead vessel 302 where a following vessel 303 may be positioned to reduce the following vessel's wave-making resistance. In the illustration, the bow of the following vessel 303 is placed in a trough of the wave pattern of the Kelvin wake of the lead vessel 302 to at least partially destructively cancel at least one wave pattern of the Kelvin wake of the at least one following vessel. By virtue of maintaining a constant spatial relationship between the vessels 302, 303 (e.g., same spacing), the following vessel 303 is maintained in the trough of the wave of the Kelvin wake as the vessels travel along their path. By reducing wave-making resistance, the operational costs (e.g., fuel consumption) of the following vessel may be reduced. However, another factor that may affect fuel consumption of vessels operating in the seaway is seaway-induced vessel motions caused by seaway waves, which is not addressed in the illustration of FIG. 3. For example, interactions between the vessels and the seaway waves may cause surge motions that alter the desired tracks of the vessels to regions outside of the reduced wave-making resistance regions 301. To return to the desired tracks, the vessels may consume fuel. As such, seaway-induced vessel motions, such as surge motions, caused by the sea waves may affect the fuel consumption required for operating the vessels in the seaway by requiring a greater return distance to desired tracks and/or a higher amount of return to desired tracks instances may be associated with a higher fuel consumption cost of the vessels.

FIG. 4 through FIG. 16 illustrate an exemplary spatial poisoning system 10 for reducing spatial positioning control requirements for maintaining reduced wave-making resistance of at least one following vessel operating in a seaway where the vessels are exposed to surge motion by the seaway waves. As described in further detail below, the system 10 reduces spatial positioning control requirements for maintaining reduced wave-making resistance of at least one following vessel following in the Kelvin wake of at least one lead vessel operating in a seaway by determining a spatial position of the following vessel within a reduced wave-making resistance region in the seaway, in which the spatial positioning in the region is also within a zone at which a surge motion of the vessels is synchronized, thereby reducing the spatial positioning control requirements of the at least one following vessel.

Figure 4:
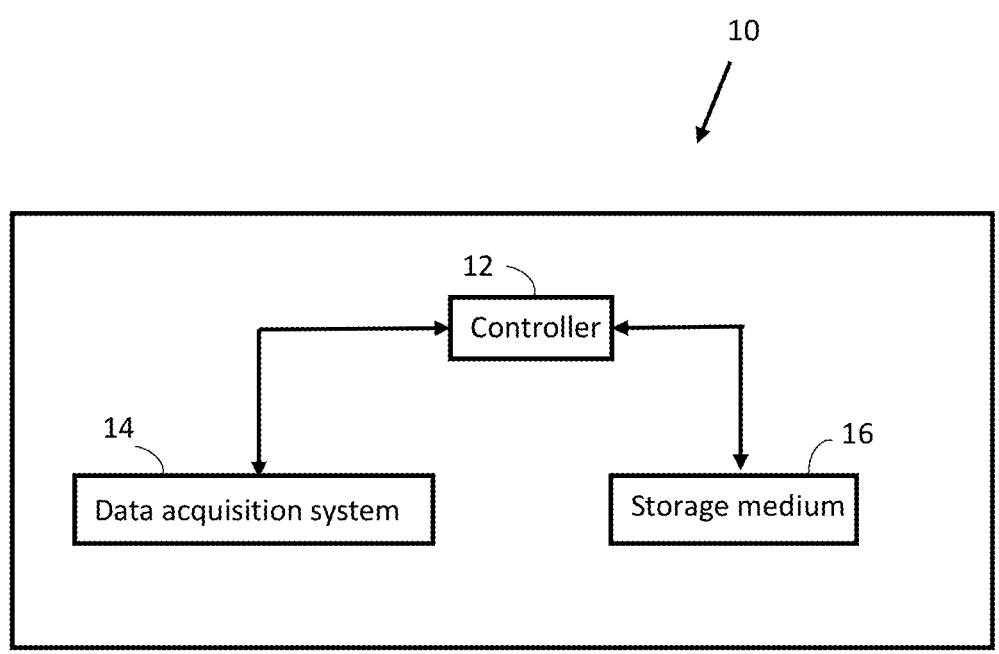
FIG. 4 is a illustrates an exemplary system for operating two or more vessels in controlled spatial relation to reduce wave-making resistance including addressing effects of sea induced motions on the vessels.

Turning to FIG. 4, the system 10 may include at least one spatial positioning controller 12, which may also be referred to as controller, at least one data acquisition system 14, and at least one storage medium 16.

Figure 5:
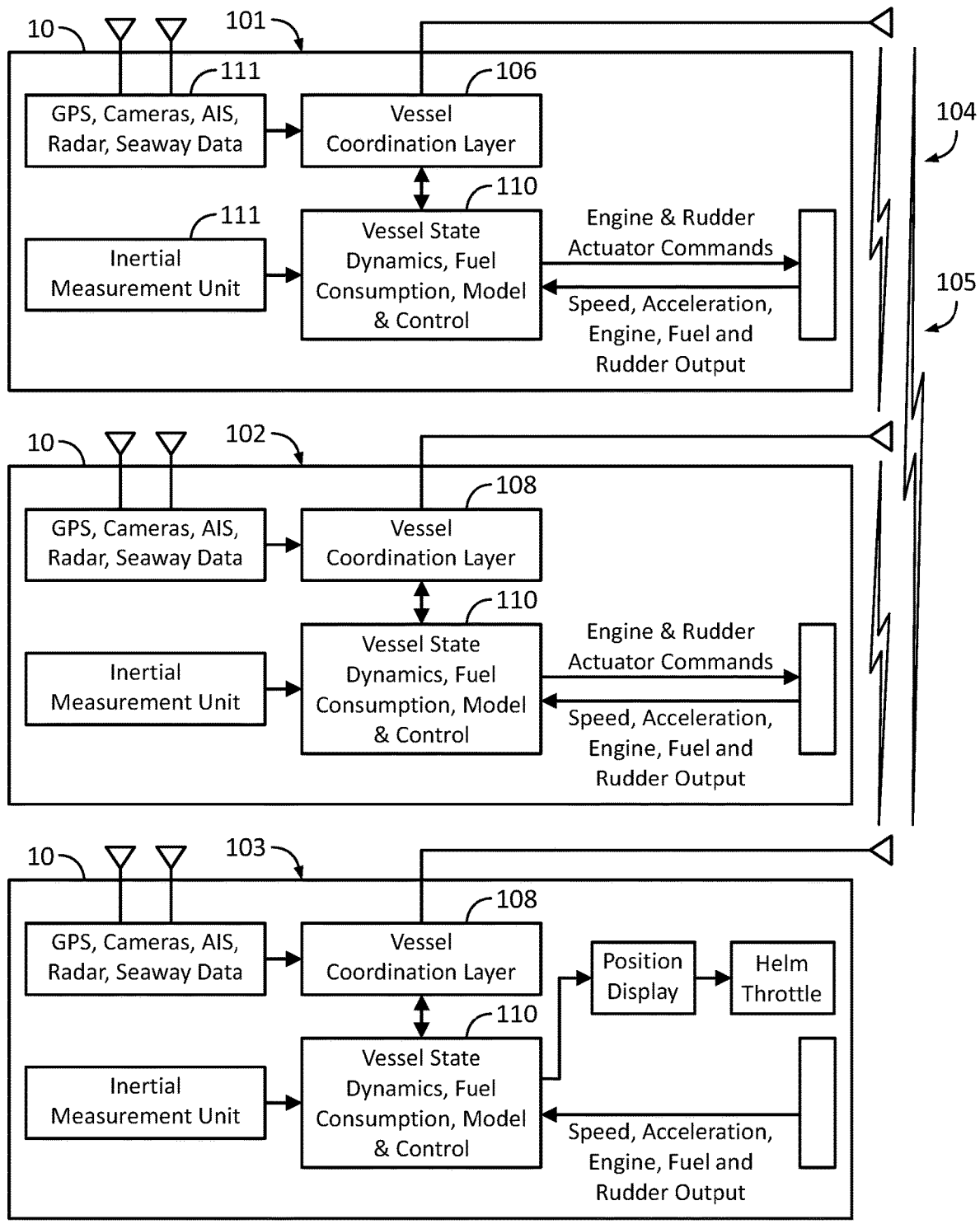
FIG. 5 illustrates a schematic of a fleet formation where each vessel may include the system.

FIG. 5 illustrates a schematic of a fleet formation where each vessel may include the system 10. For example, and with reference to FIG. 5, a first vessel 101, a second vessel 102, and a third vessel 103 may form a fleet formation 105 operating in the seaway where the first vessel 101 may be a lead vessel and the second vessel 102 and the third vessel 103 may be following vessels.

The system 10 may be utilized to reduce spatial positioning control requirements for maintaining reduced wave-making resistance of the following vessels 102 and 103 of the fleet formation 105. The system 10 may be provided on each of the vessels 101, 102, and 103, and each system 10 may include the at least one controller 12, the at least one data acquisition system 14, and the at least one storage medium 16.

In the example of FIG. 5, the at least one controller 12 of the lead vessel 101 may be a superordinate controller 106 and the at least one controller 12 of the following vessels 102 and 103 may be subordinate controllers 108. The superordinate controller 106 may be configured to determine relative spatial positioning of each of the lead vessel 101 and the following vessels 102 and 103 in the seaway.

For example, the at least one data acquisition system 14 provided on each of the vessels 101, 102, and 103 may include one or more sensors 111 such as, for example, a global positioning system (GPS), cameras, automatic identification system (AIS), radar, light detection and ranging (LIDAR), inertial measurement unit (IMU), or any other suitable sensor. The data gathered by the one or more sensors 111 may be used for determining speed and position of the vessels, or seaway-induced vessel motions, or any other suitable data.

The superordinate controller 106 may transmit data, via a communications link 104, such as a radio link, to each of the subordinate controllers 108. Each of the subordinate controllers 108 may output control signals that may directly control movement of the following vessels 102 and 103 (e.g., positional effectors, such as, for example, rudder position and propulsion thrust).

While the output of the subordinate controllers 108 has been described as directly controlling the positional effectors of the vessels 102 and 103, the output of the subordinate controllers 108 may also be configured to provide information necessary for manned operation of the vessels 102 and 103. For example, the information may be displayed on a map that may be utilized by an operator to position the vessel. Further, the superordinate controller 106 and the subordinate controllers 108 may be interchangeable such that the superordinate controller 106 may be a subordinate controller and the subordinate controllers 108 may be a superordinate controller.

In some implementations, the storage medium 16 provided on each of the vessels 101, 102, and 103 may include a database 110 storing data, such as, for example, data representing seaway-induced vessel motions, reduced wave-making resistance regions, coordinated surge motion and wave-making resistance reduction zones, vessel state dynamics, fuel consumption, model information, control information, speed, acceleration, engine output, fuel output, rudder output, or any other suitable information; however, it is to be noted that in the example of FIG. 2, the vessel 101 may not need the database 110 as it is positioned in a forward position of all other vessels 102 and 103 of the fleet formation 105.

Figure 6:
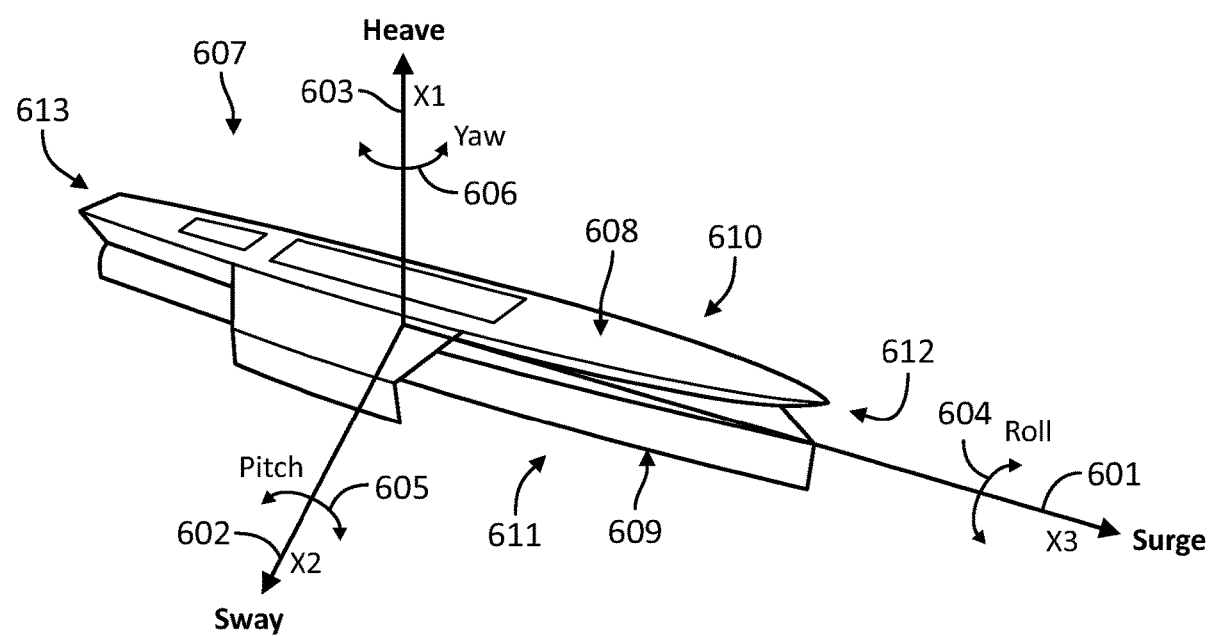
FIG. 6 illustrates six degrees of freedom (DOF) of a vessel's motion including a surge motion, a sway motion, a heave motion, a roll motion, a pitch motion, and a yaw motion.

FIG. 6 illustrates six degrees of freedom (DOF) of seaway-induced vessel motions including a surge motion 601, a sway motion 602, a heave motion 603, a roll motion 604, a pitch motion 605, and a yaw motion 606. With continued reference to FIG. 6, a vessel 607 may include a top 608, a bottom 609, a port side 610, a starboard side 611, a bow 612, and a stern 613. The top 608 and the bottom 609 may define a vertical axis X1 extending therebetween and running through a center of mass of the vessel. The port side 610 and the starboard side 611 may define a transverse axis X2 extending therebetween and running through the center of mass of the vessel. The bow 612 and the stern 613 may define a longitudinal axis extending therebetween and running through the center of mass of the vessel 607.

The surge motion 601 may be a linear motion along the longitudinal axis X3, the sway motion 602 may be a linear motion along the transverse axis X2, and the heave motion 603 may be a linear motion along the vertical axis X1. The roll motion 604 may be a rotational motion about the longitudinal axis X3, the pitch motion 605 may be a rotational motion about the transverse axis X2, and the yaw motion 606 may be a linear motion about the vertical axis X1.

The surge motion 601 may be caused by sea waves contacting the vessel 607 from either the bow 612 or the stern 613 forcing the vessel 607 to move either forward or backward along the longitudinal axis X3. The surge motion 601 may be a predominant surge motion that causes significant spatial displacement of the vessel. The predominant surge motion may be a maximum surge motion, for example, that causes the largest spatial displacement of the vessel.

To reduce spatial positioning control requirements for maintaining reduced wave-making resistance of the following vessels 102 and 103, the superordinate controller 106 may determine a position, a speed, and a wavelength and direction of sea waves that produce a surge motion in the lead vessel 101. However, it is to be understood that the subordinate controllers 108 may be utilized to determine the same information for the following vessels 102 and 103.

Figure 7:
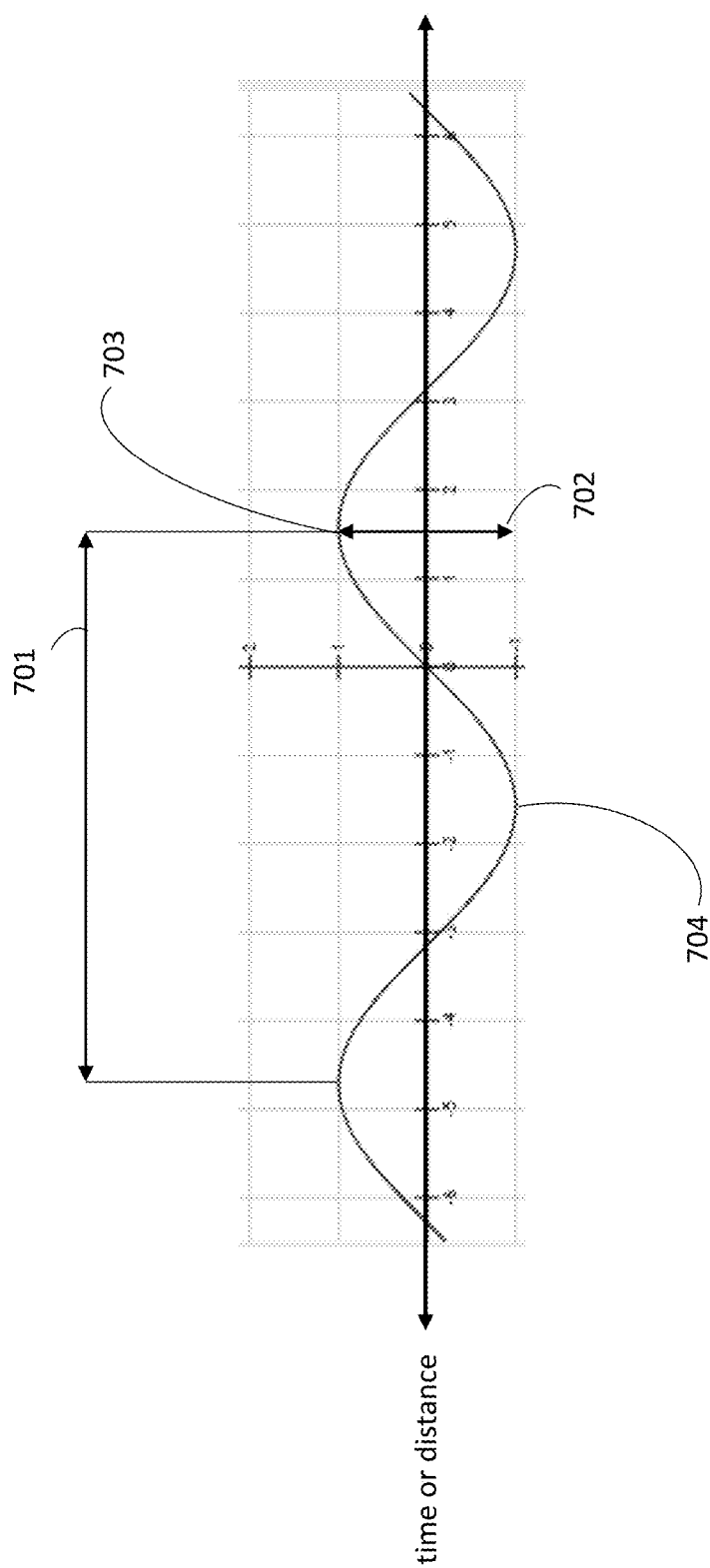
FIG. 7 illustrates an exemplary graph showing features of a sea wave including a wavelength, a height, a crest, and a trough.
Figure 8:
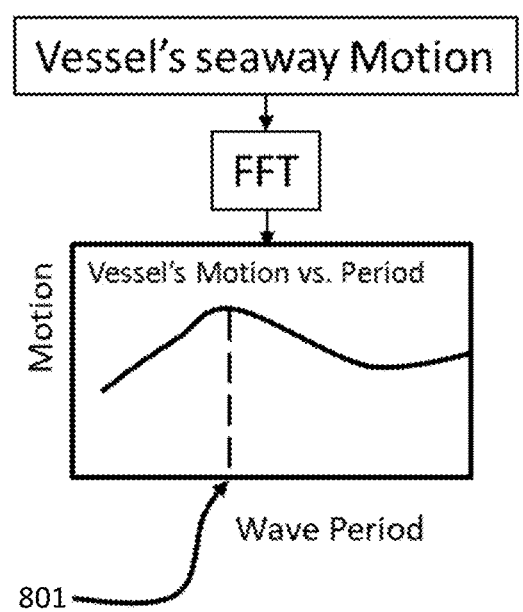
FIG. 8 illustrates a process of determining a predominant sea wave period that produces a vessel's maximum surge motion.

With reference to FIG. 7 and FIG. 8, a wavelength and a direction of sea waves may be determined by obtaining and processing seaway-induced vessel motion data. For example, the one or more sensors 111 of the at least one data acquisition system 14 may sense seaway-induced vessel motion data (e.g., acceleration, velocity, or the like) such as, for example, surge motion across a time period allowing a wavelength and direction of seaway waves to be determined.

FIG. 7 illustrates an exemplary graph showing features of a sea wave including a wavelength 701, a height 702, a crest 703, and a trough 704. For example, significant wave height may be obtained by calculating a mean wave height of one third of the highest waves measured by the at least one sensor (e.g., 111) and a mean wave period may be obtained by calculating a mean wave period of the measured waves. Additionally, the wave spectrum, which may be a function of a wave height spectrum and a wave direction spectrum, may be obtained by performing a Fast Fourier Transform (FFT) on the seaway-induced vessel motion data. Alternatively, or additionally, inverse Response Amplitude Operators (RAOs) may be used to calculate seaway-induced vessel motions and/or to determine effects that seaway state conditions may have on motion of a vessel operating in a sea. An RAO is an engineering statistic, or set of such statistics, that may be used to determine the likely behavior of a vessel when operating in a sea. For example, RAO data may include amplitude and phase data related to each of the six vessel motions for each wave period and direction being analyzed. Further, the amplitude and phase of the RAOs may vary for different types of vessels.

FIG. 8 illustrates a process of determining a period 801 (a wavelength can alternatively be determined) and direction of sea waves that produce a surge motion in a vessel. To calculate the period 801 of the sea waves, the at least one sensor 111 may obtain seaway-induced vessel motion data (e.g., acceleration, velocity, etc.). The at least one controller 12 may perform the FFT on the seaway-induced vessel motion data to determine a period 801 of the sea waves that produce a surge motion in the vessel (e.g., plot vessel surge motion versus wave period and determine a surge motion (shown as a maximum surge motion in FIG. 8) and corresponding wave period). As noted above, the surge motion may be a predominant surge motion that causes a significant spatial displacement of the vessel, such as a maximum surge motion that causes the largest spatial separation of the vessel relative to other vessels in the fleet.

Figure 9:
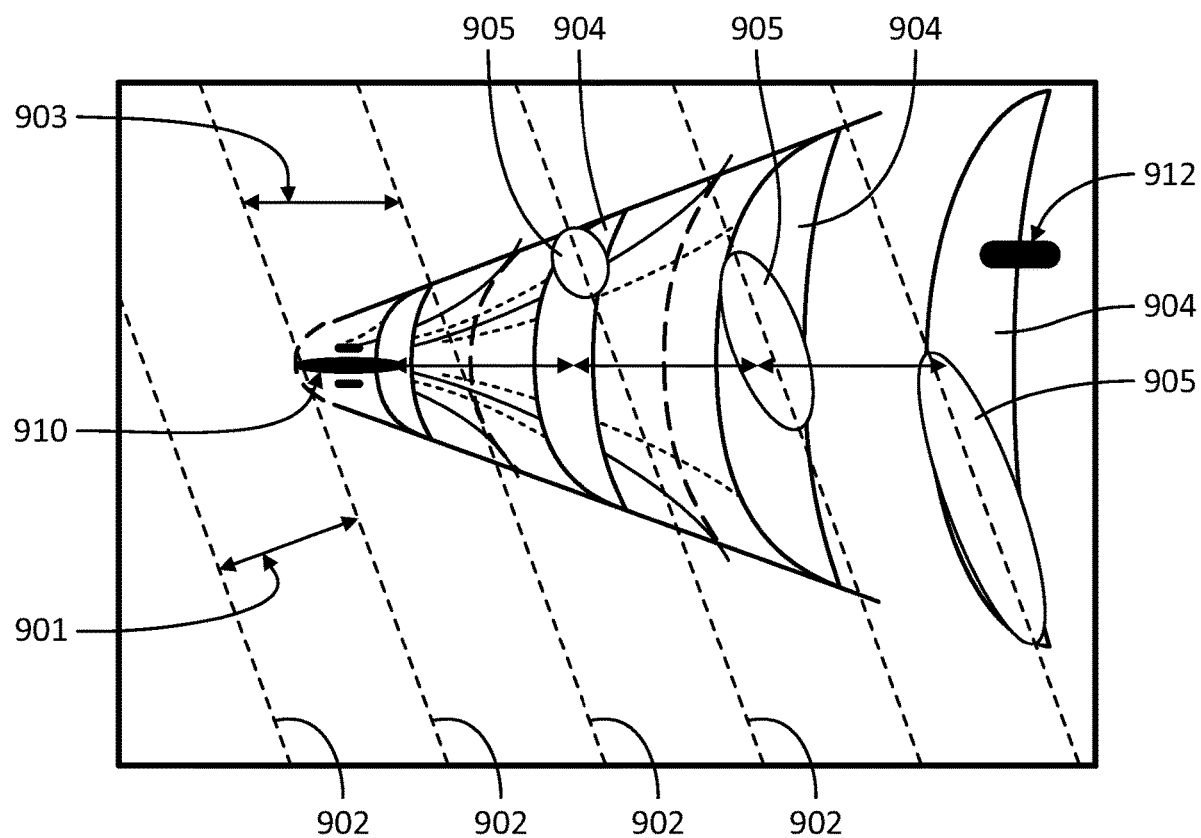
FIG. 9 illustrates a following vessel positioned within a Kelvin wake wave-making resistance reduction zone of a lead vessel, but in which the vessels are out of phase with a determined wavelength of surge-motion-inducing sea waves.

FIG. 9 illustrates a wavelength 901 of seaway waves 902 that produce a surge motion in at least a lead vessel 910 of a fleet of two vessels formed by the lead vessel 910 and at least a following vessel 912. The wavelength 901 of the surge-motion-inducing sea waves 902 can be determined in accordance with FIG. 8. As shown, the lead vessel 910 encounters the waves 902 at an angle, which produces an encounter wavelength 903. In accordance with FIG. 3, the lead vessel 910 produces a Kelvin wake in which at least one wave pattern provides reduced wave-making resistance regions 904 (e.g., crescents) at which the following vessel 912 can be positioned to reduce wave-making resistance associated with the following vessel 912. As noted above, the determination of the regions 904 within the Kelvin wake of the lead vessel 910 is such that relative spatial positioning of the following vessel 912 at least partially destructively cancels at least one wave pattern of a Kelvin wake of the following vessel 912, thereby reducing the wave-making resistance of the following vessel 912. Such destructive cancelation may be achieved by placing the bow of the following vessel 912 at a trough of the wave pattern of the Kelvin wake of the lead vessel 910, for example. Further, while the example shown in FIG. 9 illustrates a single lead vessel and a single following vessel, it is to be understood that the techniques of the present disclosure may be applied to any suitable number of lead vessels and/or following vessels forming a fleet.

Also as shown in FIG. 9, there are areas of intersection or overlap between: (i) the wave pattern (e.g., wavelength/period) of sea waves 902 that induce a surge motion of at least the lead vessel 910, and (ii) the reduced wave-making resistance regions 904. These areas of intersection, or overlap, produce coordinated surge motion and wave-making resistance reduction zones 905 (e.g., ellipses) (also referred to as "coordinated zones" 905). As shown, the coordinated zones 905 may constitute a zone (e.g., elliptical shape) within the reduced wave-making resistance region 904 having a first dimension (e.g., length) defined by where the surge-motion-inducing waves 902 intersect with the bounds of the reduced wave-making resistance region 904 (e.g., crescent), and having a corresponding second dimension (e.g., width) also bounded by the region 904. Positioning of the following vessel 912 within these coordinated zones 905 results in reduced wave-making resistance, as well as synchronized surge motion with the lead vessel 910.

As illustrated in FIG. 9, however, the following vessel 912 is not within one of the coordinated zones 905, but is instead only within a portion of the reduced wave-making resistance region 904. In other words, the lead vessel 910 and the following vessel 912 are not synchronized with each other such that they are not in phase with the surge-motion-inducing waves 902 that travel across their bows (e.g., the lead vessel 910 has its bow positioned at a trough of the wave pattern of wave 902 at a point in time, whereas the bow of the following vessel 912 is not in a trough of a corresponding wave of the wave pattern at the same point in time). Thus, while the following vessel 912 may at some time(s) have reduced wave-making resistance within region 904, the non-synchronized surge motions between the lead vessel 910 and the following vessel 912 can cause the following vessel 912 to go off track, thereby requiring additional fuel consumption to maintain its position within the region 904. As such, it would be beneficial to instead position the following vessel 912 within one of the coordinated zones 905 to both reduce wave-making resistance and synchronize its surge motion with the lead vessel 910.

Figure 10:
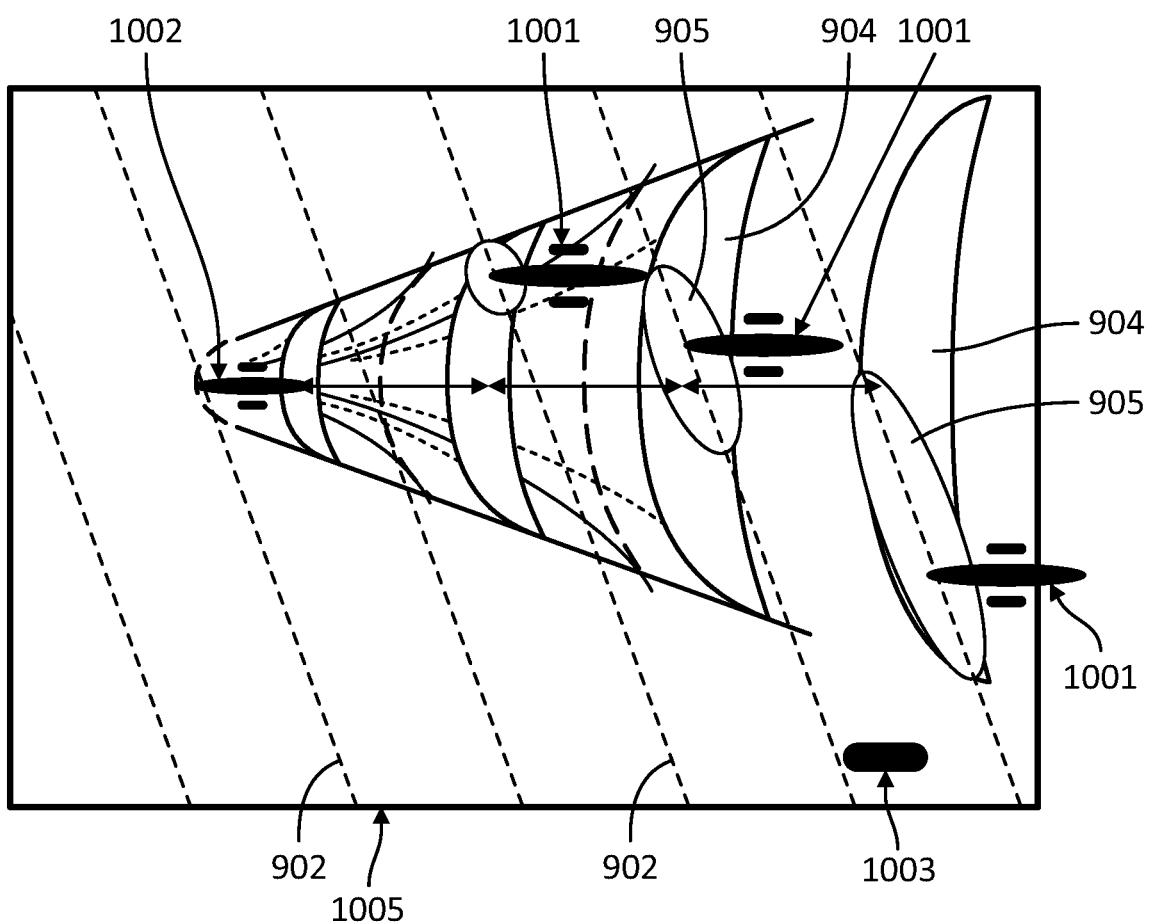
FIG. 10 illustrates a spatial arrangement of a fleet including a lead vessel and following vessels positioned where surge motions of the vessels due to predominant sea wave energy are in phase and the following vessels are positioned in Kelvin wake wave-making reduction zones.
Figure 17A:
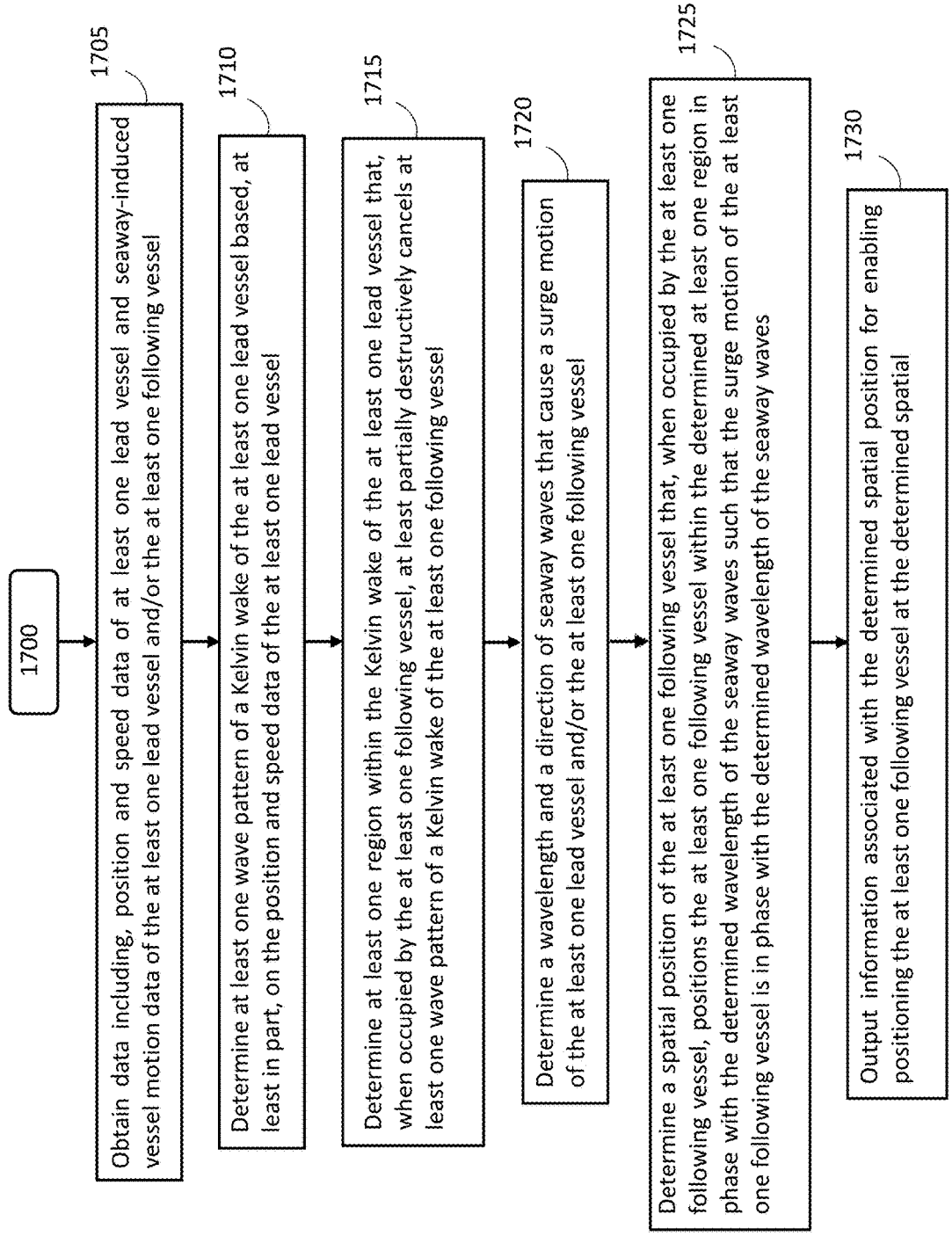
FIG. 17A illustrates a flow diagram for an exemplary spatial positioning control algorithm used by the system and/or the at least one controller of the system.

FIG. 10 illustrates spatial positioning of following vessels 1001 operating in a Kelvin wake of a lead vessel 1002 under the same seaway conditions depicted in FIG. 9 where the following vessels 1001 are positioned within the coordinated zones 905. As shown, the bows of the following vessels 1001 may be positioned such that the following vessels 1001 are within the reduced wave-making resistance regions 904 and within the coordinated zones 905. Notional positions for the bows of the following vessels 1001 within the coordinated zones 905 may be determined by combining the wavelength 901 of sea waves that produces a surge motion in the following vessels 1001, a direction calculated as described above and shown in FIG. 9, and the reduced wave-making resistance regions 904 as determined by the vessel's speed and, optionally, also its Froude number, as shown depicted in FIG. 9. For example, as shown in FIG. 10, the lead vessel 1002 and the following vessels 1001 have their surge motions synchronized with each other such that they are in phase with the surge-motion-inducing waves 902 that travel across their bows (e.g., the lead vessel 1002 has its bow positioned at a trough of the wave pattern of wave 902 at a point in time, and the bows of the following vessels 1001 also are in troughs of corresponding waves 902 of the wave pattern at the same point in time). Such synchronization of the vessels 1001, 1002 is such the seaway-induced surge motion of the vessels 1001, 1002 causes the vessels to surge together at about the same time with about the same direction and magnitude. This permits the following vessels 1001 to maintain their spatial positioning within the reduced wave-making resistance regions 904 with reduced control requirements (e.g., reduced actuation power), which thereby results in a reduction in fuel consumption of the following vessels 1001. An exemplary method of reducing the spatial positioning control requirements according to the foregoing approach is shown in FIG. 17A, which is described in further detail below.

As is apparent in FIG. 10, there may be additional vessels 1003 in the fleet that are not a lead vessel or a following vessel (e.g., no following vessels in the Kelvin wake of vessel 1003). Notwithstanding, such vessels 1003 in the fleet still may be exposed to the same surge-motion-inducing waves 902 in the region 1005, and thus may experience the same surge motions that can be used to determine a wavelength and direction of the seaway waves 902 that cause a surge motion of the lead vessel 1002 and following vessels 1001 for determining the coordinated zones 905 overlapping with the reduced wave-making reduction regions 904. It is of course understood that other suitable objects in the region 1005 having suitable sensor(s) for making such determinations could be used, including submerged vehicles, aerial vehicles, satellites, or the like.

Figure 17B:
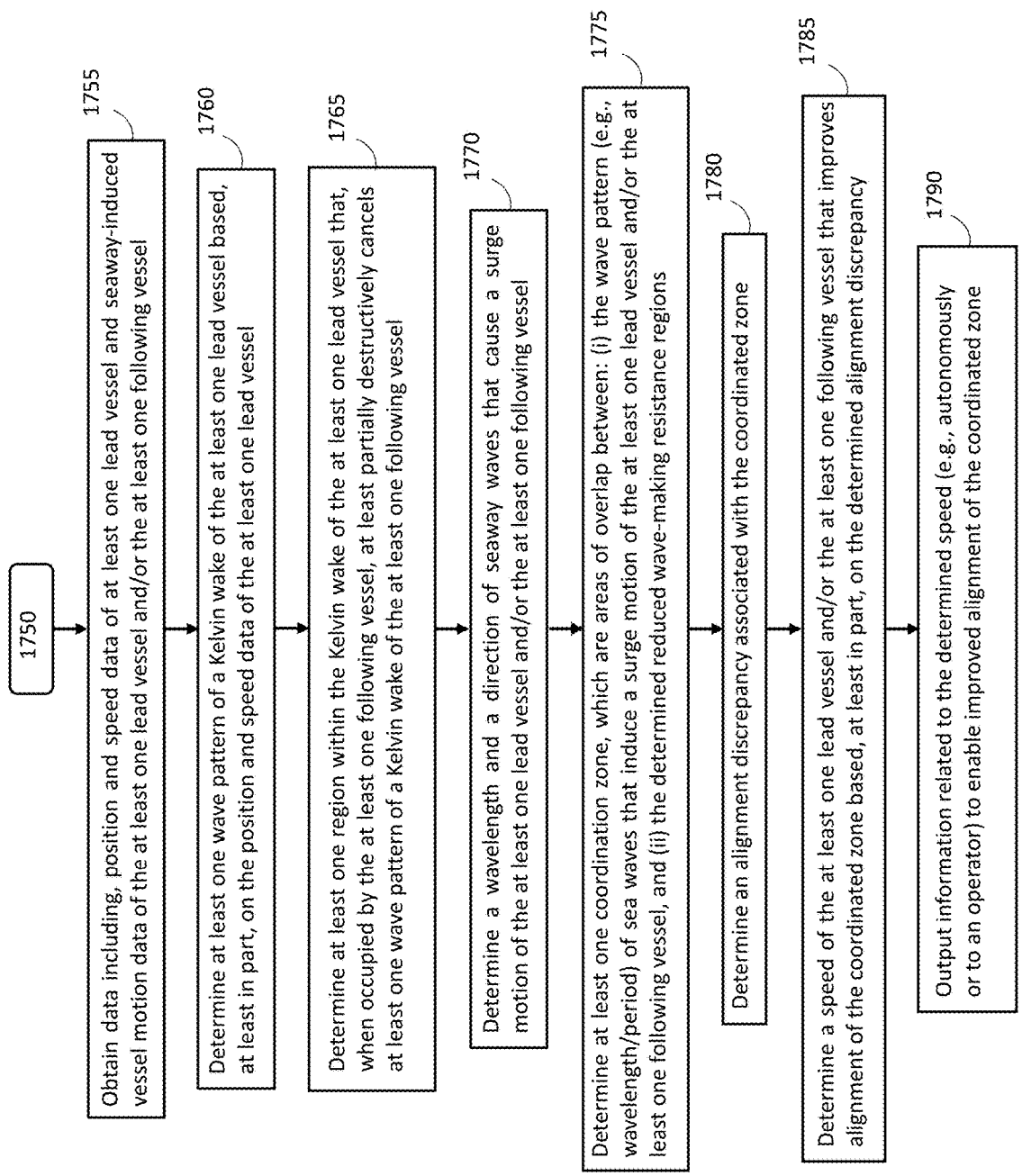
FIG. 17B illustrates another flow diagram for an exemplary spatial positioning control algorithm used by the system and/or the at least one controller of the system.

In some instances, the vessels 1001, 1002 may be operating at a desired speed of advance (SOA). The SOA is used to indicate the speed to be made along the intended track, with the intended (anticipated, desired) speed along the track being with respect to the earth, taking into consideration the effect of known or predicted current. In such a scenario, although the vessels presumably should be making good on their time of arrival, this may be at the cost of significant fuel consumption. The system according to the present disclosure can determine the reduced wave-making resistance regions 904 and the coordinated zones 905 where synchronized surge motions overlap, and then output relevant information (e.g., autonomously or to an operator) to slightly alter the speed of advance of one or more of the vessels to balance time of arrival with fuel savings. An exemplary method of adjusting the vessel speed according to the foregoing balancing approach is shown in FIG. 17B, which is described in further detail below.

Figure 17C:
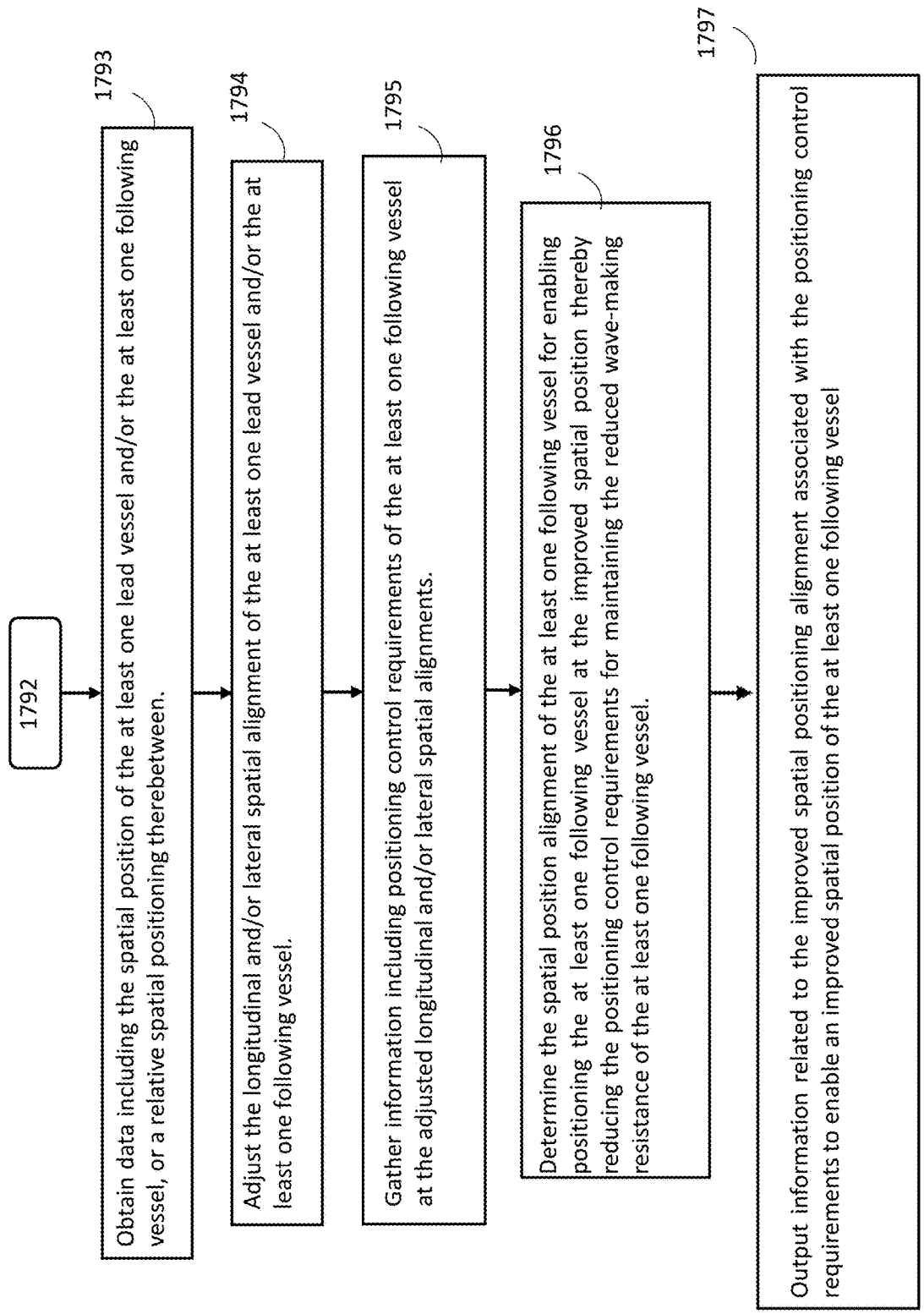
FIG. 17C illustrates another flow diagram for an exemplary spatial positioning control algorithm used by the system and/or the at least one controller of the system.

It is understood that by virtue of the relatively unexpected behavior of seaway waves, the system's modeling and simulation predictions of the vessels and environment may not be 100% accurate, and can be improved operationally by capturing and processing in-situ, real-time data, such as the measured vessel data or any other suitable data (e.g., propulsion status, rudder position, inertial data, relative spatial position, reduced wave-making resistance regions, coordinated zones, etc.). For example, the system can further improve its performance in reducing wave-making resistance by using the calculated spatial positioning locations as a starting location and then "moving about this calculated spatial position" or "hunting" based on actual vessel resistance reduction measurements (for example, fuel consumption or vessel thrust) to optimize or fine-tune the calculated spatial locations. According to such an optimization method, the system may provide positioning the vessel(s) in the reduced wave making resistance regions(s) or the coordinated zones according to the foregoing (or following) method(s), and then may systematically vary longitudinal and/or lateral positions of the vessel(s) while acquiring the control requirements for maintaining the vessel(s) within the desired regions/zones (i.e., "hunting"). The system can process this data based on acquired and processed in-situ, real-time measured vessel data to determine the optimum spatial arrangement, which this information can then be used to update the "determined spatial position" which is output for enabling the desired positioning of the vessels. An exemplary method of optimizing the reduced spatial positioning control requirements according to the foregoing hunting approach is shown in FIG. 17C, which is described in further detail below.

Figure 11:
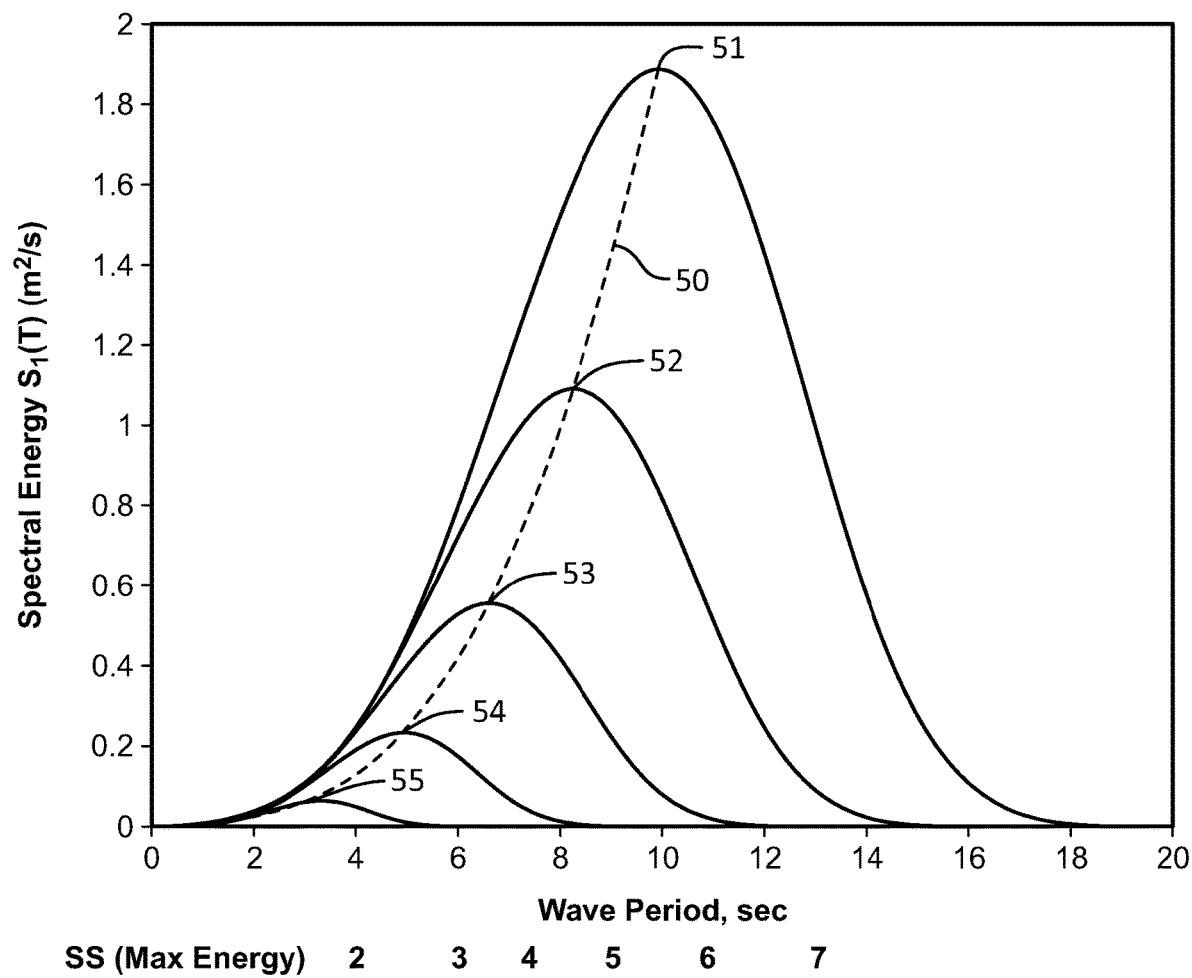
FIG. 11 illustrates sea wave spectral energy distribution and the predominant sea wave wavelengths and celerity speeds at the wave period where the maximum sea state energy occurs.

FIG. 11 illustrates seaway wave spectral energy distribution and wavelengths of seaway waves at a seaway wave period where a maximum seaway state energy occurs 50. For seaway states (SS) 2 through 6, the wavelengths of the seaway waves and sea wave celerity speeds are shown at 51 (500 ft. and 30 kts.), 52 (350 ft. and 25 kts.), 53 (225 ft. and 20 kts.), 54 (125 ft. and 15 kts.), and 55 (55 ft. and 10 kts.).

Figure 12A:
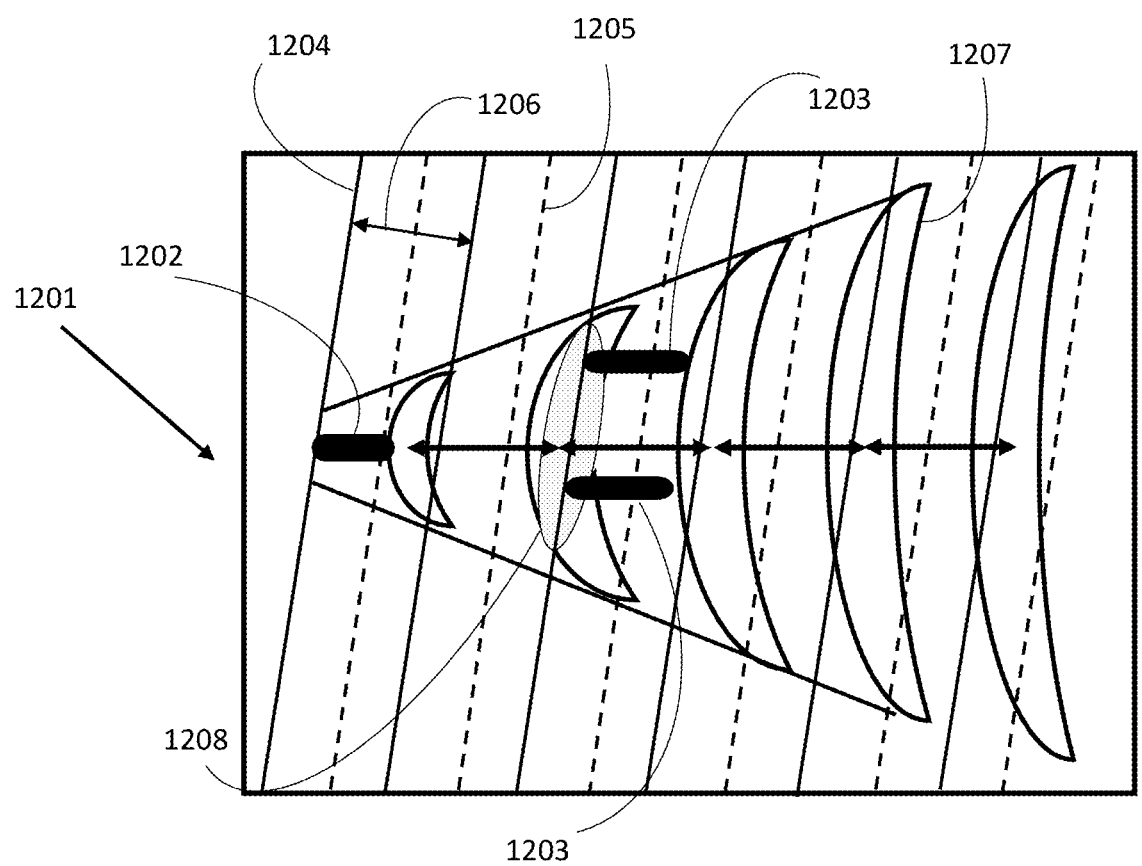
FIG. 12A illustrates a three-vessel fleet formation (each vessel may be 130 ft. trimarans operating at 16 kts in sea state 3 (as shown in FIG. 11)) in an off-head (or following) sea.

FIG. 12A illustrates a three-vessel fleet formation 1201 (e.g., a lead vessel 1202 and two following vessels 1203 each of which may be a 130 ft. trimaran operating at 16 kts in seaway state 3 (as shown in FIG. 11)) in an off-head (or following) seaway. FIG. 12A further illustrates transverse wave troughs 1204 (solid lines), transverse wave crests 1205 (dashed lines), a seaway state 3 wavelength 1206 (approximately 200 ft) of seaway waves that produces a surge motion in the vessels 1202 and 1203, reduced wave-making resistance regions 1207, and coordinated zones 1208. The reduced wave-making resistance regions 1207 may be equally spaced at a distance defined by the wavelength 1206.

The following vessels 1203 may be longitudinally spaced at one and a half transverse waves aft of the lead vessel 1202 to be positioned within the reduced wave-making resistance regions 1207 for cancellation of the Kelvin wake's transverse waves and divergent waves to minimize wave-making resistance. At this spatial separation, the following vessels 1203 may also be positioned within the coordinated zones 1208 (shown as two seaway state 3 wavelengths 1206) such that the following vessels 1203 are in phase with the wavelength of the seaway state 3 wavelength 1206. The lead vessel 1202 may also be in phase with the state 3 wavelength 1206. By being in phase with the wavelength of the seaway state 3 wavelength 1206, surging motion of the lead vessel 1202 and the following vessels 1203 may also be in phase thereby minimizing a change in longitudinal spatial separation between the vessels. This allows the following vessels 1203 to operate with reduced spatial positioning control requirements for maintaining reduced wave-making resistance. The following vessels 1203 may be positioned as near as possible to a longitudinal center of the coordinated zones 1208 to remain within the coordinated zones 1208 when the following vessels surge fore and aft.

Figure 12B:
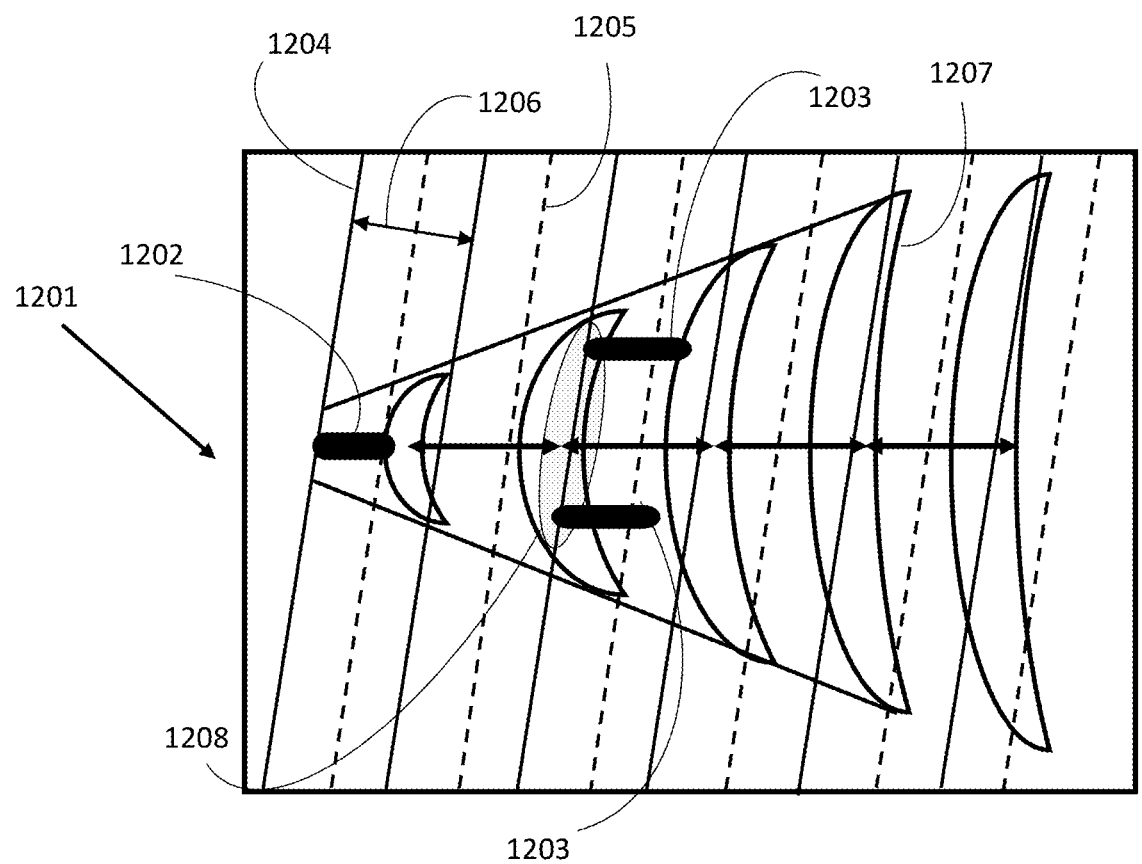
FIG. 12B is similar to FIG. 12A except with the vessels operating at a slower speed.

FIG. 12B is similar to FIG. 12A, except that the vessels are operating at a slower speed and thus the reduced wave-making resistance regions are closer together in FIG. 12B than in FIG. 12A. As is apparent these illustrations, the surge-motion-inducing sea waves do not change between FIGS. 12A and 12B, but the speed of the vessels changes the locations of the coordinated zones. As shown, the coordinated zone of the surge-motion-inducing waves overlapping with the reduced wave-making resistance regions does not align as well in FIG. 12B as in FIG. 12A. Thus, if the vessels were operating in FIG. 12B (or another scenario with even further misalignment between surge-motion-inducing waves and reduced wave-making resistance regions), the exemplary system described herein could output information that enables improved alignment (e.g., expansion) of the coordinated zone (i.e., if operating in FIG. 12B, then information could be output autonomously or to an operator that indicates an increase in speed to the state shown in FIG. 12A would enable improved alignment of the coordinated zone, and thus facilitate the reduced control requirements as described herein). As noted above, the system could adjust a desired speed of advance (SOA) of the fleet to expand the coordinated zone through improved overlap, which can then be used to balance time of arrival with fuel savings.

Figure 13:
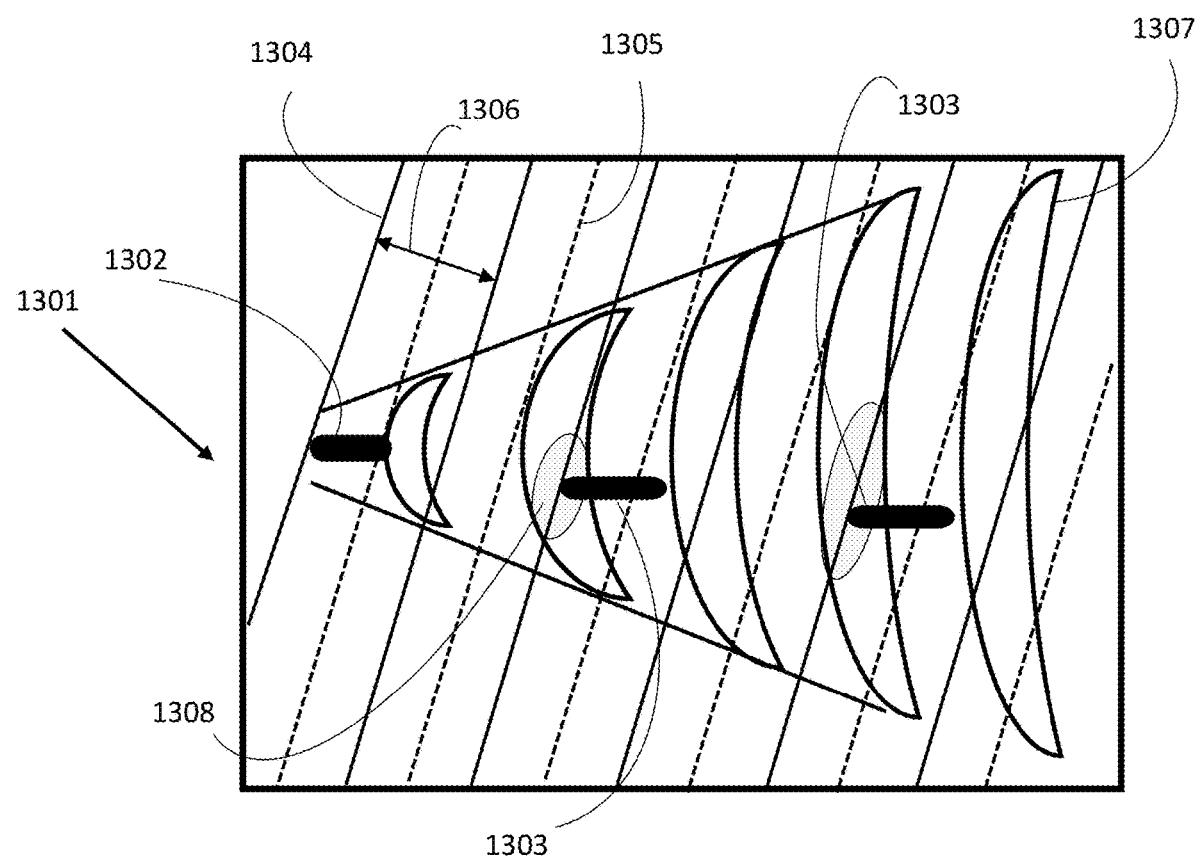
FIG. 13 illustrates a three-vessel fleet formation (each vessel may be 130 ft. trimarans operating at 16 kts in sea state 3 (as shown in FIG. 11)) at a heading of 20 or 200 degrees to the sea.

FIG. 13 illustrates a three-vessel fleet formation 1301 (e.g., a lead vessel 1302 and two following vessels 1303 each of which may be a 130 ft. trimaran operating at 16 kts in sea state 3 (as shown in FIG. 11)) at a heading of 20 or 200 degrees to the seaway. FIG. 13 further illustrates transverse wave troughs 1304 (solid lines), transverse wave crests 1305 (dashed lines), a seaway state 3 wavelength 1306 of seaway waves that produces a surge motion in the vessels 1302 and 1303, reduced wave-making resistance regions 1307, and coordinated zones 1308. The reduced wave-making resistance regions 1307 may be equally spaced at a distance defined by the wavelength 1306.

The following vessels 1303 may be spatially positioned at one and a half and three and a half transverse waves aft of the lead vessel 1302 to be positioned within the reduced wave-making resistance regions 1307 for cancellation of the Kelvin wake's transverse waves and divergent waves to minimize wave-making resistance. At this spatial separation, the following vessels 1303 may also be positioned within the coordinated zones 1308 (shown as two seaway state 3 wavelengths 1306) such that the following vessels 1303 are in phase with the wavelength of the seaway state 3 wavelength 1306. The lead vessel 1302 may also be in phase with the state 3 wavelength 1306. By being in phase with the wavelength of the seaway state 3 wavelength 1306, surging motion of the lead vessel 1302 and the following vessels 1303 may also be in phase thereby minimizing a change in longitudinal spatial separation between the vessels. This allows the following vessels 1303 to operate with reduced spatial positioning control requirements for maintaining reduced wave-making resistance. The following vessels 1303 may be positioned as near as possible to a longitudinal center of the coordinated zones 1308 to remain within the coordinated zones 1308 when the following vessels 1303 surge fore and aft.

Figure 14:
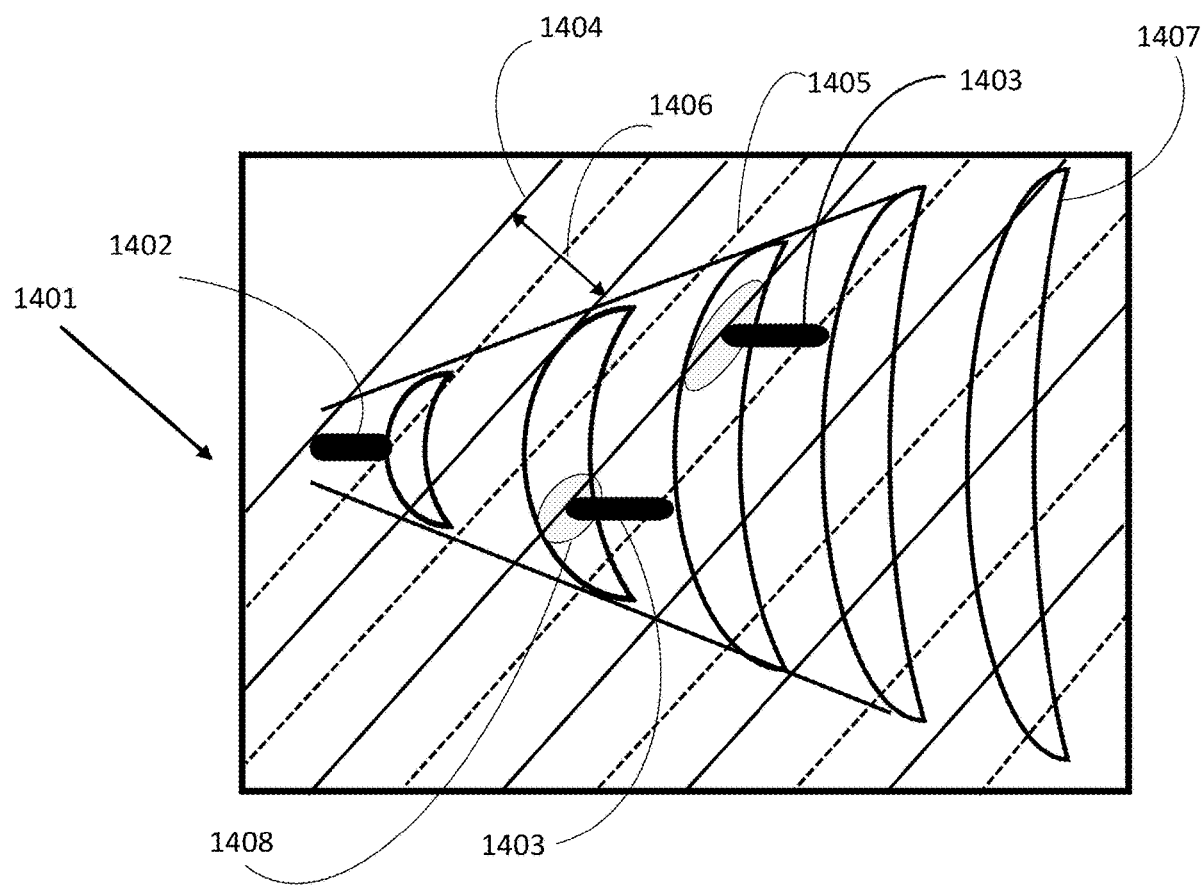
FIG. 14 illustrates a three-vessel fleet formation (each vessel may be 130 ft. trimarans operating at 16 kts, in sea state 3 (as shown in FIG. 11), in bow or stern quartering seas.)

FIG. 14 illustrates a three-vessel fleet formation 1401 (e.g., a lead vessel 1402 and two following vessels 1403 each of which may be a 130 ft. trimaran operating at 16 kts, in sea state 3 (as shown in FIG. 11), in bow or stern quartering seas.) FIG. 14 further illustrates transverse wave troughs 1404 (solid lines), transverse wave crests 1405 (dashed lines), a seaway state 3 wavelength 1406 of seaway waves that produces a surge motion in the vessels 1402 and 1403, reduced wave-making resistance regions 1407, and coordinated zones 1408. The reduced wave-making resistance regions 1407 may be equally spaced at a distance defined by the wavelength 1406.

The following vessels 1403 may be spatially positioned at one and a half and two and a half transverse waves aft of the lead vessel 1402 to be positioned within the reduced wave-making resistance regions 1407 for cancellation of the Kelvin wake's transverse waves and divergent waves to minimize wave-making resistance. At this spatial separation, the following vessels 1403 may also be positioned within the coordinated zones 1408 (shown as two seaway state 3 wavelengths 1406) such that the following vessels 1403 are in phase with the wavelength of the seaway state 3 wavelength 1406. The lead vessel 1402 may also be in phase with the state 3 wavelength 1406. By being in phase with the wavelength of the seaway state 3 wavelength 1406, surging motion of the lead vessel 1402 and the following vessels 1403 may also be in phase thereby minimizing a change in longitudinal spatial separation between the vessels. This allows the following vessels 1403 to operate with reduced spatial positioning control requirements for maintaining reduced wave-making resistance. The following vessels 1403 may be positioned as near as possible to a longitudinal center of the coordinated zones 1408 to remain within the coordinated zones 1408 when the following vessels 1403 surge fore and aft.

Figure 15:
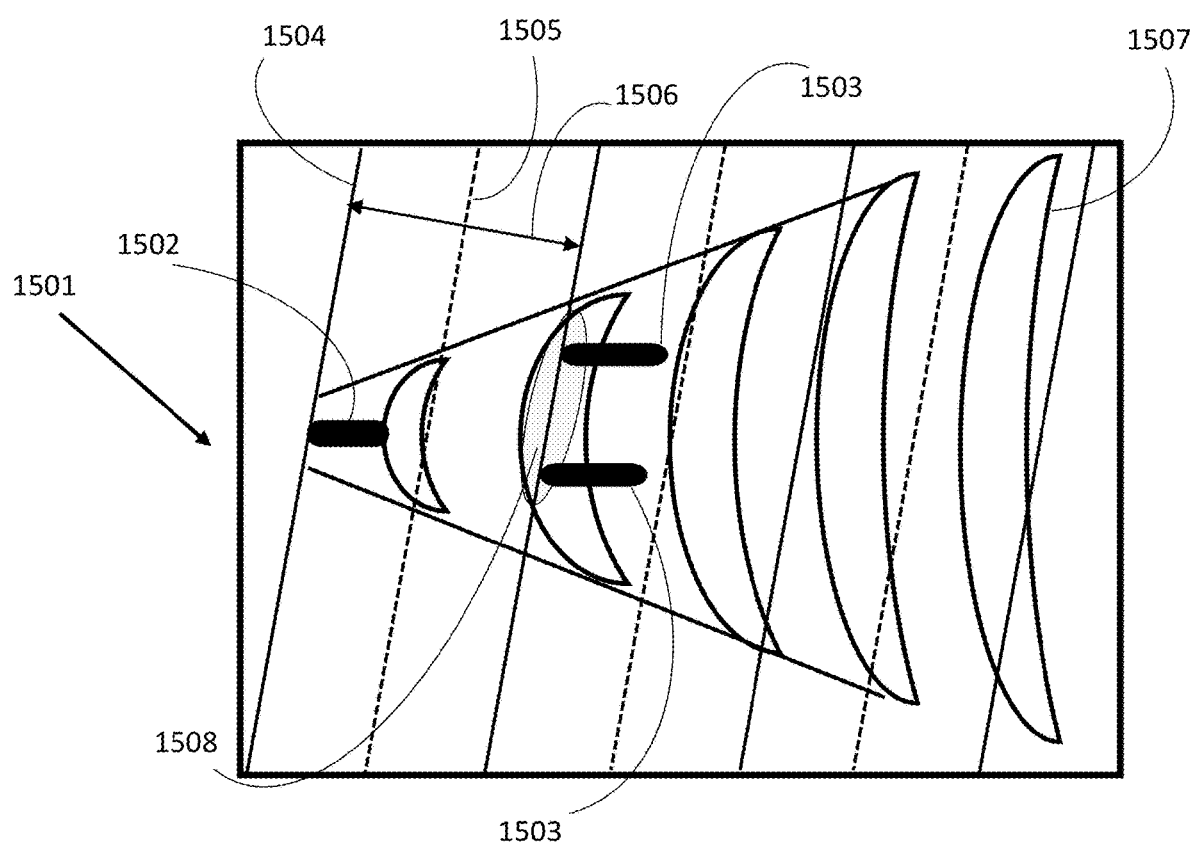
FIG. 15 illustrates a three-vessel fleet formation (each vessel may be 130 ft. trimarans operating in sea state 4 (as shown in FIG. 11)) at 16 kts in a head (or following) sea.

FIG. 15 illustrates a three-vessel fleet formation 1501 (e.g., a lead vessel 1502 and two following vessels 1503 each of which may be a 130 ft. trimaran operating in seaway state 4 (as shown in FIG. 11)) at 16 kts in a head (or following) sea. FIG. 15 further illustrates transverse wave troughs 1504 (solid lines), transverse wave crests 1505 (dashed lines), a seaway state 4 wavelength 1506 of seaway waves that produces a surge motion in the vessels 1502 and 1503, reduced wave-making resistance regions 1507, and coordinated zones 1508. The reduced wave-making resistance regions 1507 may be equally spaced at a distance defined by the wavelength 1506.

The following vessels 1503 may be spatially positioned at one and a half transverse waves aft of the lead vessel 1502 to be positioned within the reduced wave-making resistance regions 1507 for cancellation of the Kelvin wake's transverse waves and divergent waves to minimize wave-making resistance. At this spatial separation, the following vessels 1503 may also be positioned within the coordinated zones 1508 (shown as two seaway state 4 wavelengths 1506) such that the following vessels 1503 are in phase with the wavelength of the seaway state 4 wavelength 1506. The lead vessel 1502 may also be in phase with the state 4 wavelength 1506. By being in phase with the wavelength of the seaway state 4 wavelength 1506, surging motion of the lead vessel 1502 and the following vessels 1503 may also be in phase thereby minimizing a change in longitudinal spatial separation between the vessels. This allows the following vessels 1503 to operate with reduced spatial positioning control requirements for maintaining reduced wave-making resistance. The following vessels 1503 may be positioned as near as possible to a longitudinal center of the coordinated zones 1508 to remain within the coordinated zones 1508 when the following vessels 1503 surge fore and aft.

Figure 16:
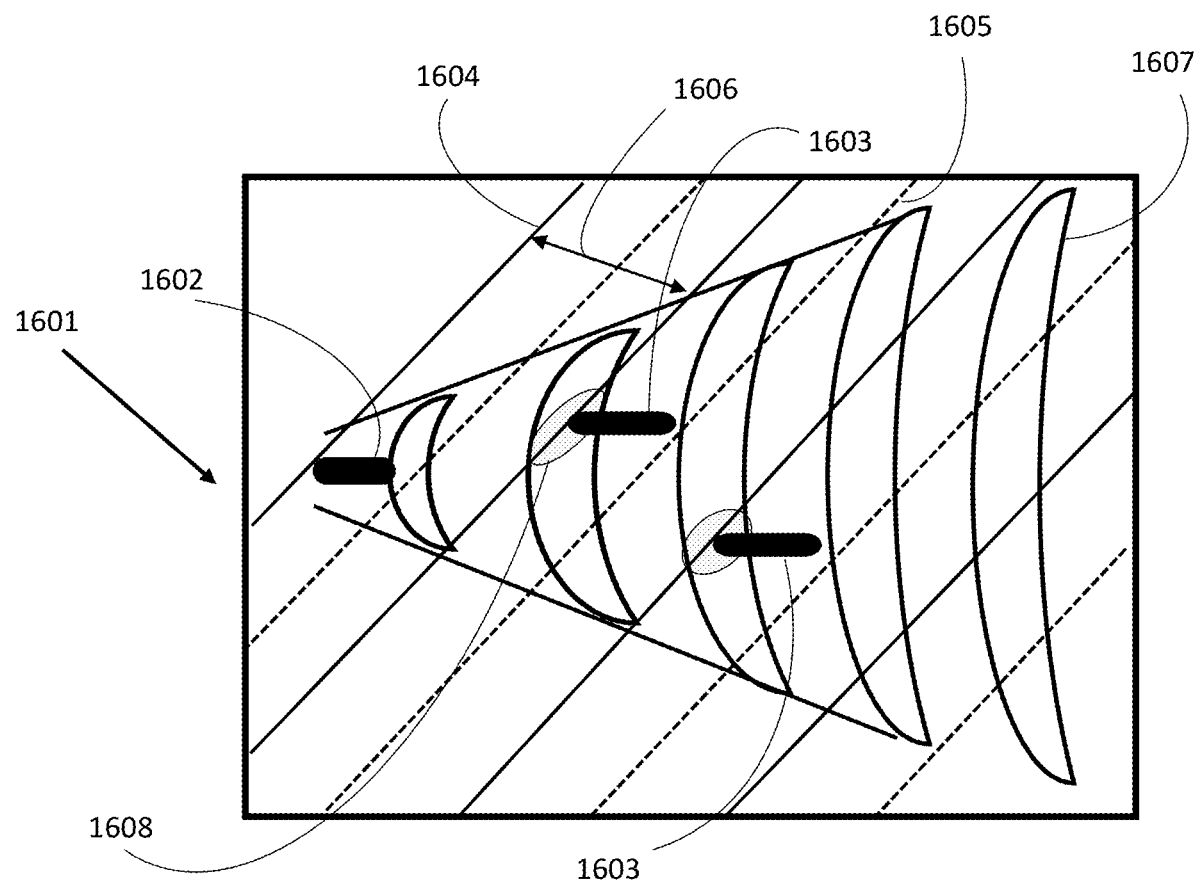
FIG. 16 illustrates a three-vessel fleet formation 1601 (each vessel may be 130 ft. trimarans operating at 16 kts in sea state 4 (as shown in FIG. 11)) in bow or stern quartering seas.

FIG. 16 illustrates a three-vessel fleet formation 1601 (e.g., a lead vessel 1602 and two following vessels 1603 each of which may be a 130 ft. trimaran operating at 16 kts in sea state 4 (as shown in FIG. 11)) in bow or stern quartering seas. FIG. 16 further illustrates transverse wave troughs 1604 (solid lines), transverse wave crests 1605 (dashed lines), a seaway state 4 wavelength 1606 (approximately 350 ft.) of seaway waves that produces a surge motion in the vessels 1602 and 1603, reduced wave-making resistance regions 1607, and coordinated zones 1608. The reduced wave-making resistance regions 1607 may be equally spaced at a distance defined by the wavelength 1606.

The following vessels 1603 may be spatially positioned at one and a half and two and a half transverse waves aft of the lead vessel 1602 to be positioned within the reduced wave-making resistance regions 1607 for cancellation of the Kelvin wake's transverse waves and divergent waves to minimize wave-making resistance. At this spatial separation, the following vessels 1603 may also be positioned within the coordinated zones 1608 (shown as two seaway state 4 wavelengths 1506) such that the following vessels 1603 are in phase with the wavelength of the seaway state 4 wavelength 1606. The lead vessel 1602 may also be in phase with the state 4 wavelength 1606. By being in phase with the wavelength of the seaway state 4 wavelength 1606, surging motion of the lead vessel 1602 and the following vessels 1603 may also be in phase thereby minimizing a change in longitudinal spatial separation between the vessels. This allows the following vessels 1603 to operate with reduced spatial positioning control requirements for maintaining reduced wave-making resistance. The following vessels 1603 may be positioned as near as possible to a longitudinal center of the coordinated zones 1608 to remain within the coordinated zones 1608 when the following vessels 1603 surge fore and aft.

The techniques may be used to control the operation of vessels of equal, similar, and/or differing hullforms (e.g., a length, a beam, a draft, a displacement, a monohull, a catamaran, a trimaran, a Small Waterplane Area Twin Hull (SWATH) etc.). The techniques of the present disclosure may be used to control formation spatial positions of multiple vessels in a significant sea at all headings with substantially reduced wave-making resistance.

The system 10 may further be used as a foundation of a fuel savings and carbon tax credit monitoring and reporting system for maritime shipping. Essentially, either a fleet operator or strategic partners could utilize common maritime traffic patterns to plan routes where collaborative ship formations could use the wave cancelation strategy described herein to save fuel and reduce greenhouse gas emissions. The savings would be recorded by system 10 and communicated to a shore-based monitoring system that would report not only fuel savings but greenhouse gas emission savings that may be used for carbon tax credits.

FIG. 17A illustrates a flow diagram for an exemplary spatial positioning control algorithm 1700 used by the at least one controller 12 of the system 10. At 1705, the spatial positioning control algorithm 1700 may obtain data including, position and speed data of at least one lead vessel and seaway-induced vessel motion data of the at least one lead vessel and/or the at least one following vessel. At 1710, the spatial positioning control algorithm 1700 may determine at least one wave pattern of a Kelvin wake of the at least one lead vessel based, at least in part, on the position and speed data of the at least one lead vessel. At 1715, the spatial positioning control algorithm 1700 may determine at least one reduced wave-making resistance region within the Kelvin wake of the at least one lead vessel that, when occupied by the at least one following vessel, at least partially destructively cancels at least one wave pattern of a Kelvin wake of the at least one following vessel. At 1720, the spatial positioning control algorithm 1700 may determine a wavelength and a direction of seaway waves that cause a surge motion of the at least one lead vessel and/or the at least one following vessel. At 1725, the spatial positioning control algorithm 1700 may determine a spatial position of the at least one following vessel that, when occupied by the at least one following vessel, positions the at least one following vessel within the determined at least one region in phase with the determined wavelength of the seaway waves such that the surge motion of the at least one following vessel is in phase with the determined wavelength of the seaway waves. At 1730, the spatial positioning control algorithm 1700 may output information associated with the determined spatial position for enabling positioning the at least one following vessel at the determined spatial position.

FIG. 17B illustrates a flow diagram for another exemplary spatial positioning control algorithm 1750 used by the at least one controller 12 of the system 10. At 1755, the spatial positioning control algorithm 1750 may obtain data including, position and speed data of at least one lead vessel and seaway-induced vessel motion data of the at least one lead vessel and/or the at least one following vessel. At 1760, the spatial positioning control algorithm 1700 may determine at least one wave pattern of a Kelvin wake of the at least one lead vessel based, at least in part, on the position and speed data of the at least one lead vessel. At 1765, the spatial positioning control algorithm 1750 may determine at least one reduced wave-making resistance region within the Kelvin wake of the at least one lead vessel that, when occupied by the at least one following vessel, at least partially destructively cancels at least one wave pattern of a Kelvin wake of the at least one following vessel. At 1770, the spatial positioning control algorithm 1750 may determine a wavelength and a direction of seaway waves that cause a surge motion of the at least one lead vessel and/or the at least one following vessel. At 1775, the spatial positioning control algorithm 1750 may determine at least one coordinated zone, which are areas of overlap between: (i) the wave pattern (e.g., wavelength/period) of sea waves that induce a surge motion of the at least one lead vessel and/or the at least one following vessel, and (ii) the determined reduced wave-making resistance regions. At 1780, the spatial positioning control algorithm 1750 may determine an alignment discrepancy associated with the coordinated zone (e.g., if the wave pattern (e.g., wavelength/period) of sea waves that induce the surge motion of the at least one lead vessel and/or the at least one following vessel is misaligned with the reduced wave-making resistance regions, the alignment discrepancy may be a distance that would align the wave pattern of sea waves that induce the surge motion of the at least one lead vessel and/or the at least one following vessel with the reduced wave-making resistance regions. At 1785, the spatial positioning control algorithm 1750 may determine a speed, such as an SOA, of the at least one lead vessel and/or the at least one following vessel, that improves alignment of the coordinated zone based, at least in part, on the determined alignment discrepancy. At 1790, the spatial positioning control algorithm 1750 may output information related to the determined speed (e.g., autonomously or to an operator) to enable improved alignment of the coordinated zone, and thus facilitate the reduced control requirements as described herein.

FIG. 17C illustrates a flow diagram for another exemplary spatial positioning control algorithm 1792 used by the at least one controller 12 of the system 10. At 1793, the algorithm 1792 may obtain data including the spatial position of the at least one lead vessel and/or the at least one following vessel, or a relative spatial positioning between them. At 1794, the algorithm 1792 may adjust the longitudinal and/or lateral spatial alignment of the at least one lead vessel and/or the at least one following vessel. At 1795, the algorithm 1792 may gather information including positioning control requirements of the at least one following vessel at the adjusted longitudinal and/or lateral spatial alignments. At 1796, the algorithm 1792 may determine the spatial position alignment of the at least one following vessel for enabling positioning the at least one following vessel at the improved spatial position thereby reducing the positioning control requirements for maintaining the reduced wave-making resistance of the at least one following vessel. At 1797, the algorithm 1792 may output information related to the improved spatial positioning alignment associated with the positioning control requirements to enable positioning the at least one following vessel at the determined improved spatial position. The position of the at least one following vessel may be automatically or manually adjusted to the determined improved spatial position.

Figure 18:
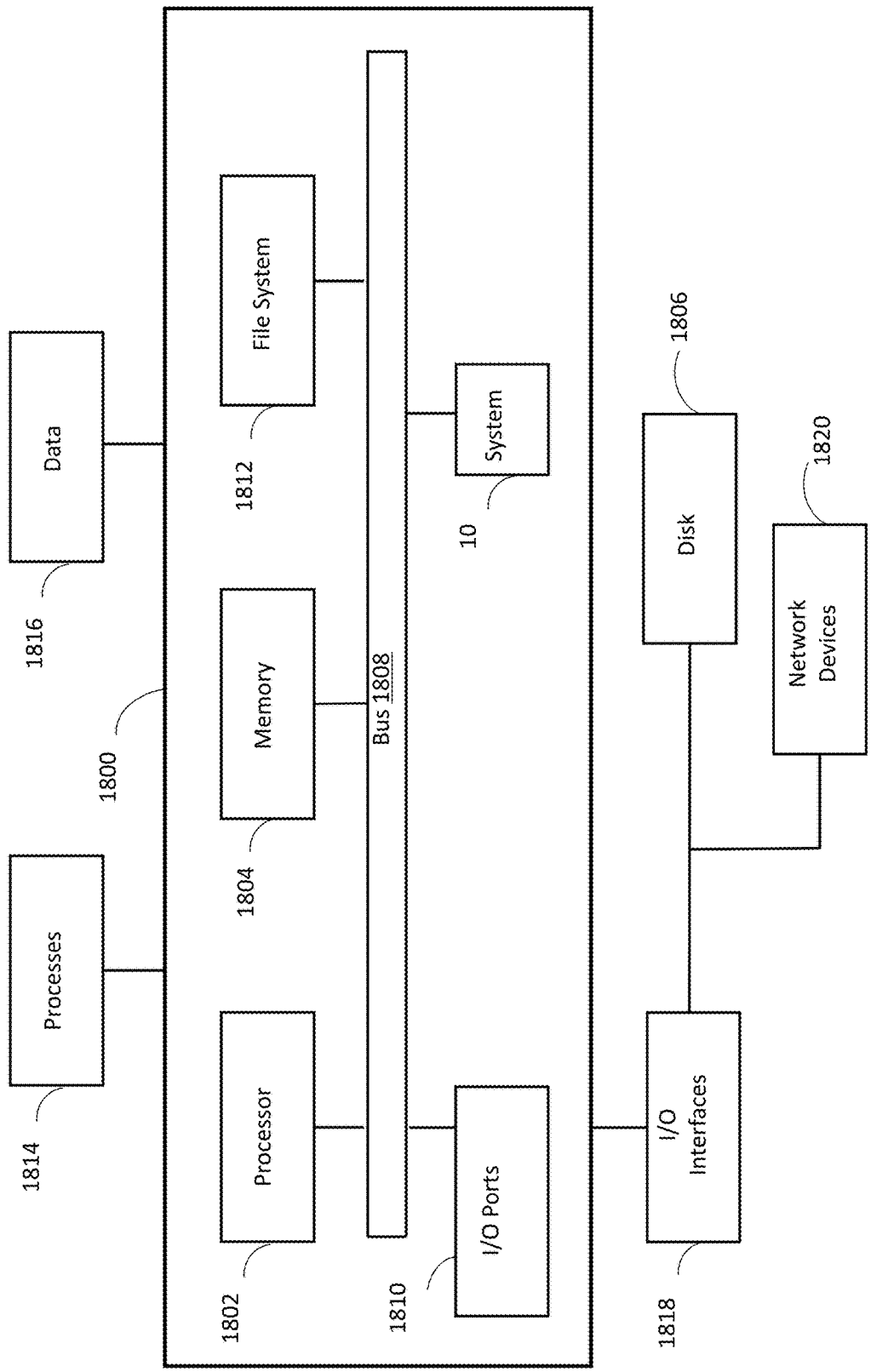
FIG. 18 illustrates a block diagram of an exemplary machine for operating two or more vessels in controlled spatial relation to reduce wave-making resistance including addressing effects of sea induced motions on the vessels.

FIG. 18 illustrates a block diagram of an exemplary machine 1800 for operating two or more vessels in controlled spatial relation to reduce wave-making resistance. The machine 1800 includes a processor 1802, a memory 1804, I/O Ports 1810, and a file system 1812 operably connected by a bus 1808.

In one example, the machine 1800 may transmit input and output signals via, for example, I/O Ports 1710 or I/O Interfaces 1818. The machine 1800 may also include the system 10 and its associated components (e.g., the at least one controller 12). Thus, the system 10, and its associated components, may be implemented in machine 1800 as hardware, firmware, software, or combinations thereof and, thus, the machine 1800 and its components may provide means for performing functions described herein as performed by the system 10, and its associated components.

The processor 1802 can be a variety of various processors including dual microprocessor and other multi-processor architectures. The memory 1804 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 1806 may be operably connected to the machine 1800 via, for example, an I/O Interfaces (e.g., card, device) 1818 and an I/O Ports 1810. The disk 1806 can include, but is not limited to, devices like a magnetic disk drive, a solid state disk drive, a floppy disk drive, a tape drive, a Zip drive, a flash memory card, or a memory stick. Furthermore, the disk 1806 can include optical drives like a CD-ROM, a CD recordable drive (CD-R drive), a CD rewriteable drive (CD-RW drive), or a digital video ROM drive (DVD ROM). The memory 1804 can store processes 1814 or data 1816, for example. The disk 1806 or memory 1804 can store an operating system that controls and allocates resources of the machine 1800.

The bus 1808 can be a single internal bus interconnect architecture or other bus or mesh architectures. While a single bus is illustrated, it is to be appreciated that machine 1800 may communicate with various devices, logics, and peripherals using other busses that are not illustrated (e.g., PCIE, SATA, Infiniband, 1394, USB, Ethernet). The bus 1808 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The machine 1800 may interact with input/output devices via I/O Interfaces 1818 and I/O Ports 1810. Input/output devices can include, but are not limited to, a keyboard, a microphone, a pointing and selection device, cameras, video cards, displays, disk 1806, network devices 1820, and the like. The I/O Ports 1810 can include but are not limited to, serial ports, parallel ports, and USB ports.

The machine 1800 can operate in a network environment and thus may be connected to network devices 1820 via the I/O Interfaces 1818, or the I/O Ports 1810. Through the network devices 1820, the machine 1800 may interact with a network. Through the network, the machine 1800 may be logically connected to remote devices. The networks with which the machine 1800 may interact include, but are not limited to, a local area network (LAN), a wide area network (WAN), and other networks. The network devices 1820 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 1720 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, or through a network may include combinations and mixtures of communications.

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A system for reducing spatial positioning control requirements for maintaining reduced wave-making resistance of at least one following vessel in a fleet of vessels operating in a seaway, comprising:
at least one electronic controller configured to:
obtain data including:
position and speed data of at least one lead vessel in the fleet; and
seaway-induced vessel motion data of one or more vessels in the fleet;
determine at least one wave pattern of a Kelvin wake of the at least one lead vessel based, at least in part, on the position and speed data of the at least one lead vessel;
determine at least one reduced wave-making resistance region within the Kelvin wake of the at least one lead vessel that, when occupied by the at least one following vessel, at least partially destructively cancels at least one wave pattern of a Kelvin wake of the at least one following vessel;
determine a wavelength and a direction of seaway waves that cause a surge motion of the one or more vessels in the fleet based, at least in part, on the seaway-induced vessel motion data;
determine a spatial position of the at least one following vessel that, when occupied by the at least one following vessel, positions the at least one following vessel within at least one coordinated zone, which is a zone within the determined at least one reduced wave-making resistance region in which the at least one lead vessel and the at least one following vessel have a synchronized surge motion, wherein the synchronized surge motion is based, at least in part, on the determined wavelength and the direction of the seaway waves that cause the surge motion of the of one or more vessels in the fleet; and
output information associated with the determined spatial position of the at least one following vessel to position the at least one following vessel at the determined spatial position thereby reducing the positioning control requirements and maintaining the reduced wave-making resistance of the at least one following vessel.

2. The system according to claim 1, wherein the surge motion of the one or more vessels in the fleet is a predominant surge motion.

3. The system according to claim 2, the surge motion of the one or more vessels in the fleet is a maximum surge motion that causes the largest displacement in spatial separation between the one or more vessels in the fleet.

4. The system according to claim 1, wherein the surge motion of the one or more vessels in the fleet is other than a maximum surge motion.

5. The system according to claim 1, wherein:
the seaway-induced vessel motion data is that of the at least one lead vessel and/or the at least one following vessel; and
the determined wavelength and direction of seaway waves that cause a surge motion of the at least one lead vessel and/or the at least one following vessel are based, at least in part, on the seaway-induced vessel motion data.

6. The system according to claim 1, wherein:
the seaway-induced vessel motion data is that of another vessel in the fleet that is not the at least one lead vessel and is not the at least one following vessel; and
the determined wavelength and direction of seaway waves that cause a surge motion of the another vessel are determined to be the same as that for the at least one lead vessel and the at least one following vessel.

7. The system according to claim 1, further comprising:
one or more sensors configured to: measure information including position and speed information of the at least one lead vessel and the seaway-induced vessel motion data of the one or more vessels in the fleet; and
wherein the at least one electronic controller is configured to obtain the data, including the position and speed data of at least one lead vessel in the fleet, and the seaway-induced vessel motion data of one or more vessels in the fleet, from the information measured by the one or more sensors.

8. The system according to claim 7, wherein the one or more sensors are: (i) onboard the at least one lead vessel, (ii) onboard the at least one following vessel, (iii) onboard at least one other vessel in the fleet that is not the at least one lead vessel and is not the at least one following vessel, and/or (iv) a localized sensor within the region of the fleet.

9. The system according to claim 1, wherein the at least partially destructive cancelation is achieved by placing a bow of the at least one following vessel within a trough of the wave pattern of the Kelvin wake of the at least one lead vessel.

10. The system according to claim 1, wherein the at least partially destructive cancelation is achieved by placing a bow of the at least one following vessel at a position other than the trough of the wave pattern of the Kelvin wake of the at least one lead vessel.

11. The system according to claim 1, wherein the synchronized surge motion causes the at least one lead vessel and the at least one following vessel to surge together within a threshold time period of each other and with a direction and magnitude within a threshold amount of each other.

12. The system according to claim 1, wherein the surge motion of the one or more vessels in the fleet is a forward surge motion or a rearward surge motion.

13. The system according to claim 1, wherein the surge motion of the one or more vessels in the fleet oscillates with both forward and rearward surge motion.

14. The system according to claim 1, wherein the at least one coordinated zone is at least one area of intersection or overlap between: (i) a wave pattern of sea waves that induce the surge motion of the one or more vessels in the fleet, and (ii) the determined at least one reduced wave-making resistance region.

15. The system according to claim 14, wherein the at least one coordinated zone includes a first dimension defined by where the wave pattern of sea waves that induce the surge motion of the one or more vessels in the fleet intersect with bounds of the determined at least one reduced wave-making resistance region.

16. The system according to claim 14, wherein the at least one electronic controller is further configured to:
determine an alignment discrepancy associated with an alignment of the at least one coordinated zone; and improving the alignment of the at least one coordinated zone based, at least in part, on the determined alignment discrepancy.

17. The system according to claim 16, wherein the improving the alignment of the at least one coordinated zone based, at least in part, on the determined alignment discrepancy includes:
determining a speed of the at least one lead vessel and/or the at least one following vessel that, if implemented by the at least one lead vessel and/or the at least one following vessel; improves alignment of the at least one coordinated zone based, at least in part, on the determined alignment discrepancy; and
output information related to the determined speed to adjust a current speed of the at least one lead vessel and/or the at least one following vessel and improve the alignment of the at least one coordinated zone.

18. The system according to claim 16, wherein the determined alignment discrepancy includes a misalignment of the intersection of the wave pattern of sea waves that induce the surge motion of the one or more vessels in the fleet with the bounds of the determined at least one reduced wave-making resistance region.

19. The system according to claim 1, wherein the at least one electronic controller is further configured to:
adjust longitudinal and/or lateral spatial alignment of the at least one lead vessel and/or the at least one following vessel;
gather information including positioning control requirements of the at least one following vessel at the adjusted longitudinal and/or lateral spatial alignments;
determine the spatial position alignment of the at least one following vessel to position the at least one following vessel at the improved spatial position thereby reducing the positioning control requirements and maintaining the reduced wave-making resistance of the at least one following vessel; and
output information related to the improved spatial positioning alignment associated with the positioning control requirements to position at the improved spatial position of the at least one following vessel.

20. The system according to claim 14, wherein the at least one area of intersection or overlap produce coordinated surge motion and wave-making resistance reduction zones.

21. The system according to claim 1, wherein the at least one coordinated zone is elliptical in shape.

22. The system according to claim 1, wherein a speed of advance (SOA) is determined, and the system adjusts the speed of advance (SOA).

23. The system according to claim 1, wherein the output information is used to automatically adjust the spatial positioning of the at least one following vessel; or wherein the output information is output to a display for an operator to adjust the spatial positioning of the at least one following vessel based at least in part upon the output information on the display.

24. A method of reducing spatial positioning control requirements for maintaining reduced wave-making resistance of at least one following vessel in a fleet of vessels operating in a seaway, the method comprising:
determining at least one wave pattern of a Kelvin wake of at least one lead vessel in the fleet;
determining at least one reduced wave-making resistance region within the Kelvin wake of the at least one lead vessel that; when occupied by the at least one following vessel, at least partially destructively cancels at least one wave pattern of a Kelvin wake of the at least one following vessel;
determining a wavelength and a direction of seaway waves that cause a surge motion of one or more vessels in the fleet;
determining a spatial position of the at least one following vessel that; when occupied by the at least one following vessel, positions the at least one following vessel within at least one coordinated zone, which is a zone within the determined at least one reduced wave-making resistance region in which the at least one lead vessel and the at least one following vessel have a synchronized surge motion, wherein the synchronized surge motion is based, at least in part, on the determined wavelength and the direction of the seaway waves that cause the surge motion of the of one or more vessels in the fleet; and
positioning the at least one following vessel at the determined spatial position.

25. The method according to claim 24, further comprising:
determining an alignment discrepancy associated with an alignment of the at least one coordinated zone; and
improving the alignment of the at least one coordinated zone based, at least in part, on the determined alignment discrepancy.

26. The method according to claim 25, wherein the improving the alignment discrepancy includes:
determining a speed of the at least one lead vessel and/or the at least one following vessel that, if implemented by the at least one lead vessel and/or the at least one following vessel, improves the alignment of the at least one coordinated zone; and
adjusting a current speed of the at least one lead vessel and/or the at least one following vessel based, at least in part, on the determined speed.

27. The method according to claim 24,
further comprising: measuring information with one or more sensors, including at least that of (i) position and speed information of the at least one lead vessel, and (ii) seaway-induced vessel motion data of the one or more vessels in the fleet;
wherein at least that of (i) the determining the at least one wave pattern of the Kelvin wake of the at least one lead vessel in the fleet, and (ii) the determining the wavelength and the direction of seaway waves that cause the surge motion of the one or more vessels in the fleet, is at least partially based upon the information measured by the one or more sensors.

28. The method according to claim 24,
wherein the positioning the at least one following vessel at the determined spatial position is an automatic adjustment based upon commands by at least one electronic controller; or
wherein the positioning the at least one following vessel at the determined spatial position is a manual adjustment by a user based upon information output by the at least one electronic controller to a display.

29. A non-transitory computer readable medium storing program code which when executed by one or more processors performs at least the steps:
determine at least one wave pattern of a Kelvin wake of the at least one lead vessel based, at least in part, on the position and speed data of the at least one lead vessel;
determine at least one reduced wave-making resistance region within the Kelvin wake of the at least one lead vessel that, when occupied by the at least one following vessel, at least partially destructively cancels at least one wave pattern of a Kelvin wake of the at least one following vessel;

determine a wavelength and a direction of seaway waves that cause a surge motion of the one or more vessels in the fleet based, at least in part, on the seaway-induced vessel motion data;

determine a spatial position of the at least one following vessel that, when occupied by the at least one following vessel, positions the at least one following vessel within at least one coordinated zone, which is a zone within the determined at least one reduced wave-making resistance region in which the at least one lead vessel and the at least one following vessel have a synchronized surge motion, wherein the synchronized surge motion is based, at least in part, on the determined wavelength and the direction of the seaway waves that cause the surge motion of the of one or more vessels in the fleet; and output information associated with the determined spatial position of the at least one following vessel to position the at least one following vessel at the determined spatial position thereby reducing the positioning control requirements and maintaining the reduced wave-making resistance of the at least one following vessel.

\* \* \* \* \*